(12) United States Patent  (10) Patent No.: US 8,499,456 B2
Yamashita et al.  (45) Date of Patent: Aug. 6, 2013

(54) METHOD FOR PRODUCING A HOUSING FOR A FLUID BEARING APPARATUS

(75) Inventors: Nobuyoshi Yamashita, Kuwana (JP); Toshiyuki Mizutani, Kuwana (JP); Tetsuya Kurimura, Kuwana (JP); Kiyoshi Shimizu, Awara (JP); Yoshitaka Kabata, Awara (JP); Masatoshi Tanigawa, Awara (JP); Eiichi Fujita, Awara (JP); Koji Yamagata, Awara (JP); Masato Utiumi, Awara (JP)

(73) Assignee: NTN Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/210,969

(22) Filed: Aug. 16, 2011

(65) Prior Publication Data

US 2011/0296896 A1 Dec. 8, 2011

Related U.S. Application Data

(62) Division of application No. 11/816,058, filed as application No. PCT/JP2006/300235 on Jan. 11, 2006.

(30) Foreign Application Priority Data

Feb. 10, 2005 (JP) .................................. 2005-034225
Feb. 22, 2005 (JP) .................................. 2005-046041

(51) Int. Cl.
*B21D 53/10* (2006.01)
*B21D 22/00* (2006.01)
(52) U.S. Cl.
USPC ............. 29/898.02; 29/898; 72/352; 72/358; 384/100; 384/120

(58) Field of Classification Search
USPC ................. 29/898.02, 898; 72/352, 356, 358, 72/359, 267; 384/100, 107, 114, 115, 120, 384/121; 310/90; 360/99.07, 99.08
See application file for complete search history.

(56) References Cited

U.S. PATENT DOCUMENTS 4,038,860 A * 8/1977 Kanamaru et al. ............. 72/358
4,478,066 A * 10/1984 Olschewski et al. ........... 72/358
(Continued)

FOREIGN PATENT DOCUMENTS

JP 6-277788 A 10/1994
JP 8-196055 A 7/1996
(Continued)

OTHER PUBLICATIONS

Japanese Office Action dated Dec. 8, 2011, issued in corresponding Japanese Patent Application No. 2005-46041.(w/Partial English translation).

(Continued)

*Primary Examiner* — Sarang Afzali
(74) *Attorney, Agent, or Firm* — Westerman, Hattori, Daniels & Adrian, LLP

(57) ABSTRACT

A method for producing a housing for a hydrodynamic bearing apparatus includes forming a housing 7 which has a cylindrical shape and which includes a fixing face 7c for fixing the outer circumferential surface 8b of a bearing sleeve 8, and axial circulation grooves 7d for bringing both end faces 8c, 8d of the bearing sleeve 8 into circulation on the inner periphery. The method includes providing a groove molding portion 18a2 on the outer circumference of a rod 18 which serves as a forming mold for the inner periphery of the housing 7, and forming the circulation grooves 7d of the housing by forging with the groove molding portion 18a2 of the mold. Moreover, after a sealing face 107d and a cylindrical outer circumferential surface 107e provided on the outer periphery of the housing 107 are formed by forging, an inner circumferential surface 107c is formed by forging.

2 Claims, 10 Drawing Sheets

U.S. PATENT DOCUMENTS

| | | |
|---|---|---|
| 6,250,807 B1 | 6/2001 | Mori et al. |
| 6,768,236 B2 | 7/2004 | Tokunaga et al. |
| 7,021,829 B2 | 4/2006 | Tamaoka |
| 7,048,444 B2 * | 5/2006 | Kurimura et al. ............ 384/119 |
| 7,092,203 B2 | 8/2006 | Inoue et al. |
| 7,448,804 B2 | 11/2008 | Satoji et al. |
| 2003/0091249 A1 | 5/2003 | Kurimura et al. |
| 2003/0169952 A1 | 9/2003 | Yamashita et al. |
| 2003/0184911 A1 | 10/2003 | Sode et al. |
| 2003/0230943 A1 | 12/2003 | Tokunaga et al. |

FOREIGN PATENT DOCUMENTS

| | | |
|---|---|---|
| JP | 8196055 A | 7/1996 |
| JP | 9-323137 A | 12/1997 |
| JP | 2000-087953 A | 3/2000 |
| JP | 2000-240642 A | 9/2000 |
| JP | 2001304247 A | 10/2001 |
| JP | 2002-061636 A | 2/2002 |
| JP | 2003-172336 A | 6/2003 |
| JP | 2003172336 A | 6/2003 |
| JP | 2003-239951 A | 8/2003 |
| JP | 2003-278759 A | 10/2003 |
| JP | 2004-316924 A | 11/2004 |
| JP | 2004316929 A | 11/2004 |
| JP | 2004322169 A | 11/2004 |
| JP | 2004-360921 A | 12/2004 |
| WO | 2004/092600 A1 | 10/2004 |

OTHER PUBLICATIONS

Japanese Office Action dated Sep. 30, 2010, issued in corresponding Japanese Patent Application No. 2005-046041 with partial English translation.

International Search Report of PCT/JP2006/300235, date of mailing May 16, 2006.

* cited by examiner

METHOD FOR PRODUCING A HOUSING FOR A FLUID BEARING APPARATUS

CROSS-REFERENCE TO RELATED APPLICATIONS

This application is a Divisional of U.S. application Ser. No. 11/816,058, filed Sep. 18, 2008, wherein U.S. application Ser. No. 11/816,058 is a national stage application filed under 35 USC §371 of International Application No. PCT/JP2006/300235, filed Jan. 11, 2006, the contents of which are incorporated herein by reference in their entirety.

BACKGROUND OF THE INVENTION (1) Field of the Invention

The present invention relates to a housing for fluid lubrication bearing apparatuses and a housing for hydrodynamic bearing apparatuses, and a method for producing the same. A fluid lubrication bearing apparatus or a hydrodynamic bearing apparatus comprising this housing is suitably used in spindle motors for information appliances, for example, magnetic disk apparatuses such as HDD, optical disk apparatuses such as CD-ROM, CD-R/RW, DVD-ROM/RN, magneto-optic disk apparatuses such as MD and MO, polygon scanners motors of laser beam printers (LBP), and other small motors.

(2) Description of the Related Art

High rotational accuracy, enhanced speed, cost reduction, noise reduction, etc., are required for the above various kinds of motors. One of the components which determine these required performances is a bearing which supports a spindle of such motors. In recent years, the use of a fluid lubrication bearing having excellent characteristics in the above required performance is examined or such a bearing is actually used.

Fluid lubrication bearings of this type can be roughly classified into hydrodynamic bearings comprising a hydrodynamic pressure producing means which produces the hydrodynamic pressure a fluid (for example, lubricating oil or the like) in a bearing gap, and so-called cylindrical bearings (bearings having a perfectly circular bearing face) which do not have a hydrodynamic pressure producing means.

For example, in some fluid lubrication bearing apparatuses integrated into spindle motors of disk drive units such as HDD, both a radial bearing portion which supports a rotational member in the radial direction and a thrust bearing portion which supports the rotational member in the thrust direction are constituted of hydrodynamic bearings. Known thrust bearing portions in the fluid lubrication bearing apparatuses (hydrodynamic bearing apparatus) of this type include, for example, that which comprises hydrodynamic grooves formed as a hydrodynamic pressure producing part on one of both end faces of a flange portion of a shaft portion provided at the rotational member, faces opposing these faces (end faces of the bearing sleeve, the upper end face at the bottom of the housing, or a thrust member fixed on the housing, end faces of a lid member, etc.), or that which comprises a thrust bearing gap formed between both faces (for example, refer to Japanese Unexamined Patent Publication No. 2003-239951).

Moreover, there is a known bearing in which grooves (circulation grooves) through which a fluid flows in the axial direction are provided on the outer circumferential surface of the bearing sleeve for the purpose of appropriately maintaining the pressure of the fluid (maintaining the pressure balance with other portions) in a region apart from the side which is open to the air (for example, a thrust bearing portion positioned on the inside on the side opposite to the sealing space of the housing) such as a sealing space (refer to for example, Japanese Unexamined Patent Publication No. 2003-307212).

Bearing apparatuses of this type are constituted of a housing, bearing sleeve, shaft member and various other parts. To ensure high bearing performance required for improved performance of information appliances, efforts for increasing the processing accuracy and assembly precision of each part have been made. In contrast, with the trend of a decrease in the prices and the miniaturization of information appliances, a demand for cost reduction and miniaturization in this type of bearing apparatuses is increasing.

In particular, to meet the requirement for miniaturization of recent information appliances associated with their portability, size reduction of each component of bearing apparatuses is examined. For example, for size reduction of the bearing sleeve in a cylindrical shape, thinning is indispensable. However, providing circulation grooves on the outer periphery of the bearing sleeve accordingly may cause adverse effects described below.

A bearing sleeve is normally formed of a sintered metal, and a hydrodynamic pressure producing part such as hydrodynamic grooves is formed on its inner periphery by sizing after sintering. After the sizing, a bearing sleeve removed from a die or the like causes spring back, and its outer periphery is displaced (expanded) to the outer diameter side. During the sizing, since a circulation groove region of the outer circumferential surface is not in contact with the die or the like and therefore pressure is not exerted on the inner diameter side, the amount of its spring back becomes smaller than in other places. By adjusting the number of the circulation grooves (for example, three), imbalance in the amount of spring back can be decreased to a certain degree. However, as mentioned above, the thinner the wall thickness becomes, the more noticeable the imbalance in the amount of spring back becomes. In this manner, the inner circumferential surface and outer circumferential surface of the bearing sleeve after the sizing are not in the shape of a perfect circle, but its cross section is in the shape of an ellipse whose first diameter lies in the vicinity of the circulation grooves or an approximate polygon. Accordingly, variation in the circumferential direction of a radial bearing gap between the bearing sleeve and the shaft portion becomes great, which may fail to provide stable bearing rigidity.

Recently, to deal with an increase information recording density in information appliances and rotational speed, even higher rotational accuracy is demanded for spindle motors for the above information appliances. To meet this request, even higher rotational accuracy is also required for hydrodynamic bearing apparatuses integrated into the above spindle motors.

To improve rotational accuracy (bearing performance) of hydrodynamic bearing apparatuses, it is important to very accurately control the radial bearing gap and thrust bearing gap in which hydrodynamic pressure occurs. Accordingly, high dimensional accuracy is required for component parts of the hydrodynamic bearing apparatus relating to the formation of the bearing gaps mentioned above.

In contrast, recently, to achieve size reduction and reduction of the number of parts of the bearing apparatus, forming the thrust bearing gap mentioned above between an end face of the housing and an end face of the rotational member (for example, disk hub) opposing this is examined.

In this case, to achieve high rotational accuracy of the bearing apparatus, high dimensional accuracy is required not only for the shaft member and bearing sleeve, but also for an end face region which serves as a thrust bearing face of the housing. Alternatively, excellent high shape accuracy is also required among other faces constituting the housing. However, currently existing processing methods are unable to increase the accuracy since processing costs are significantly increased.

BRIEF SUMMARY OF THE INVENTION

A first object of the present invention is to provide a fluid lubrication bearing apparatus which can stably produce high bearing performance at low costs.

A second object of the present invention is to provide a housing for hydrodynamic bearing apparatuses having improved accuracy of form.

A third object of the present invention is to provide a method for producing a housing for hydrodynamic bearing apparatuses which can improve the accuracy of form of the housing of this type at low costs.

To achieve the first object mentioned above, the present invention provides a housing for fluid lubrication bearing apparatuses which forms a cylindrical shape and has a fixing face for fixing the outer circumferential surface of the bearing sleeve onto its inner periphery formed thereon, the inner periphery comprising axial circulation grooves for bringing both end faces of the bearing sleeve into circulation formed thereon, and the fixing face and circulation grooves being both formed by forging.

Thus, the amount of spring back of the bearing sleeve after the sizing is made uniform throughout its circumference by providing axial circulation grooves for bringing both axial end faces of the bearing sleeve into circulation on the inner periphery of the housing. Accordingly, the circularity of the inner circumferential surface or the outer circumferential surface of the bearing sleeve can be very accurately maintained. For example, the radial bearing gap between the inner circumferential surface and the rotational member can be appropriately managed. Moreover, when the axial circulation grooves are provided on the outer circumferential surface of the bearing sleeve, molding of the circulation grooves is carried out simultaneously with molding of a green compact. Therefore, dies and punches of green compact forming mold corresponding to the circulation grooves are required. In the present invention, however, such molds can be simplified and the required costs can be reduced by providing them on the housing side.

An example of possible methods for forming axial circulation grooves on the inner periphery of the housing is cutting. In this manner, however, a processing step in addition to a process (lathe turning process) for forming the fixing face on the inner periphery of the housing becomes necessary, leading to higher costs. Moreover, cutting powder is inevitably produced in cutting, and this may enter into the fluid as contaminants. To prevent this, complicated cleaning steps are required such as additional cleaning processes of the housing after cutting performed dividedly in a few times, leading to higher costs.

In contrast, as in the present invention, forming both the circulation grooves and the fixing face by forging enables forming them by an identical process, costs can be therefore reduced compared to the case where they are formed in separate steps. Moreover, a forging process generally has a shorter cycle time than cutting, and therefore the production efficiency (mass productivity) can be improved. In addition, cutting powder is not produced in a forging process unlike in cutting, and the formation of burrs is suppressed compared to the case where the housing is formed of a resin. Therefore, the cleaning operation can be simplified and the trouble of removing burrs can be dispensed with, achieving further cost reduction.

Moreover, to achieve the first object mentioned above, the present invention provides a method for producing a housing for fluid lubrication bearing apparatuses, the method comprising, in forming a housing for fluid lubrication bearing apparatuses which has a cylindrical shape and a fixing face for fixing the outer circumferential surface of the bearing sleeve formed on its inner periphery by forging, providing a groove molding portion extending parallel to the direction of the stroke of the mold on a forging mold and forming circulation grooves with this groove molding portion by forging.

As mentioned above, the circulation grooves are formed by forging using the forging mold provided with a groove molding portion extending parallel to the direction of the stroke of the mold, whereby axial circulation grooves are accurately and readily formed on the inner periphery of the housing.

Moreover, by providing a face molding portion for forming a fixing face on a forging mold provided with a groove molding portion and forming circulation grooves and fixing face by forging with these groove molding portion and face molding portion, the fixing face and the circulation grooves of the housing are simultaneously formed in a single forging pressing process (one stroke). This can further shorten the cycle time, enabling to further improve the mass productivity.

The housing having the above constitution can be presented as a fluid lubrication bearing apparatus comprising, for example, this housing, a bearing sleeve fixed on the fixing face of the housing, a rotational member which rotates relative to the bearing sleeve and the housing, a radial bearing portion which supports the rotational member in the radial direction in a non-contact support by a lubricating film of a fluid occurring in a radial bearing gap between the rotational member and the bearing sleeve, and a sealing space provided on an opening end side of the housing and is open to the air.

A fluid lubrication bearing apparatus having the above constitution can be so constituted, for example, that the fluid is circulated between the inside at the other end of the housing and the sealing space constitution. Such a constitution enables to appropriately maintain the pressure balance of the fluid inside the bearing, and therefore stable bearing performance is produced for a long period.

A fluid lubrication bearing apparatus having the above constitution can also be provided as a spindle motor for disk apparatuses having this fluid lubrication bearing apparatus.

To achieve the second object mentioned above, the present invention provides a housing for hydrodynamic bearing apparatuses which is a cylindrical forged product and comprises a thrust bearing face forming a thrust bearing gap between itself and the rotational member to be supported, the perpendicularity of the thrust bearing face with respect to the inner circumferential surface or outer circumferential surface being 20 µm or less. the perpendicularity mentioned herein means the amount of the disorder of a planar configuration (referring to the thrust bearing face herein.) which is to be parallel from a perpendicular geometric plane with respect to the reference axis (referring to a line connecting the center of the cross section outline in each cross section of the inner circumferential surface or outer circumferential surface herein. Hereinafter referred to simply as the axis of the inner circumferential surface or the outer circumferential surface.). Its amount is represented as the interval of two planes, when its planar configuration (thrust bearing face) is placed between by two geometrically parallel planes perpendicular to the reference axis (the axis of the inner circumferential surface or outer circumferential surface), at the point that the interval of the two parallel planes is minimum. It should be noted that the thrust bearing face mentioned herein may be any bearing face that faces the thrust bearing gap in which the hydrodynamic effect is produced, and whether it has hydrodynamic grooves for producing the hydrodynamic effect is not critical.

Moreover, to achieve the second object mentioned above, the present invention provides a housing for hydrodynamic bearing apparatuses which is a cylindrical forged product, and comprises a thrust bearing face forming a thrust bearing gap between itself and a rotational member to be supported, and a sealing face forming a sealing space between itself and the rotational member, the sealing face having the coaxiality with respect to the inner circumferential surface or the outer circumferential surface of 20 μm or less. The coaxiality mentioned herein means the dimension of disorder from the reference axis of は, reference axis (referring to the axis of the inner circumferential surface or outer circumferential surface herein.) an axis which is to be on the same straight line (referring herein to the line connecting the center of the cross section outline in each cross section of the sealing face. Hereinafter referred to simply as the sealing face axis.). Its amount is represented by the smallest diameter of the cylinder among the geometrically correct cylinders which contains the entire axis (the axis of the sealing face) mentioned above and are coaxial with the reference axis (the axis of the inner circumferential surface or outer circumferential surface).

Moreover, to achieve the second object mentioned above, the present invention provides a housing for hydrodynamic bearing apparatuses which is a cylindrical forged product and comprises a thrust bearing face forming a thrust bearing gap between itself and the rotational member to be supported, the outer circumferential surface having the coaxiality with respect to the inner circumferential surface of 20 μm or less. The coaxiality mentioned herein means the amount of disorder of an axis which is to be on the same straight line (referring to the axis of the outer circumferential surface herein) as the reference axis (referring to the axis of the inner circumferential surface herein) mentioned above from the reference axis. Its amount is represented by the diameter of the smallest cylinder among the geometrically correct cylinders which contain the entire above axis (the axis of the outer circumferential surface) and are coaxial with the reference axis (the axis of the inner circumferential surface).

The geometric deviation (accuracy of form) between the above faces constituting the housing has been established on the basis of the findings of the inventors described below.

The perpendicularity of the thrust bearing face with respect to the inner circumferential face or outer circumferential surface greatly affects the accuracy of the thrust bearing gap between the thrust bearing face and the end face of the rotational member opposing this. That is, if the perpendicularity of the above thrust bearing face is greater than 20 μm, the difference between a wide portion and narrow portion of the above thrust bearing gap becomes noticeable. Accordingly, the rotational torque of the shaft member at a narrow portion of the above bearing gap becomes higher than at other portions, increasing bearing losses, while the bearing rigidity at a wide portion of the above bearing gap is lowered than in other portions, which may disadvantageously reduce non-repeatable runout (NRRO). Moreover, the time required for the rotational member to float after the motor is started is increased, and the sliding abrasion during the period is increased, which may adversely affect the bearing life. From such a perspective, the perpendicularity of the thrust bearing face with respect to the inner circumferential face or outer circumferential surface is 20 μm in the present invention.

Moreover, the coaxiality of the sealing face with respect to the inner circumferential surface or outer circumferential surface of the housing is important in forming the sealing space between this sealing face and the rotational member opposing this. When this coaxiality is not satisfactory (greater than 20 μm), even if the bearing sleeve is mounted onto the housing very accurately, disposing the sealing face of the housing opposing the face on the rotational member side which is to oppose this face at constant intervals becomes difficult. This may cause a variation in the sealing gap of the sealing space formed between both faces in the circumferential direction and lower the sealing performance. From such a perspective, the coaxiality of the sealing face with respect to the inner circumferential surface or outer circumferential surface is set to 20 μm or less in the present invention.

Moreover, as mentioned above, the inner circumferential surface of the housing serves as the mounting reference for the bearing sleeve of the rotational member (shaft portion), while the outer circumferential surface of the housing serves as a position reference for integrating the hydrodynamic bearing apparatus with the bearing sleeve and rotational member mounted thereon on the housing into the motor. Accordingly, if the coaxiality between the two faces is not good (greater than 20 μm), for example, the mounting precision for a fixing-side member (bracket, etc.) Of the motor is reduced and of the opposing interval of a coil and magnet which produce the drive force of the motor is difficult to be managed appropriately, which may adversely affect the rotational accuracy of the motor. From such a perspective, the coaxiality of the outer circumferential surface with respect to the inner circumferential surface of the housing is set to 20 μm or less in the present invention.

Examples of other accuracy of form of the housing to be met include the perpendicularity of the thrust bearing face with respect to the axis of the sealing face. This perpendicularity is desirably 20 μm or less. Moreover, examples of other accuracy of form to be met include the runout of the sealing face with respect to the axis of the inner circumferential surface. This runout is desirably 20 μm or less. Further, examples of other accuracy of form to be met include the profile of the sealing face. This profile is desirably 20 μm or less. These geometric deviations (perpendicularity, surface runout, profile) relating to the sealing face are acceptable when at least one of them is satisfied, but it is better if two or more of the above geometric deviations are satisfied.

Moreover, to achieve the third object mentioned above, the present invention provides a method for producing a housing for hydrodynamic bearing apparatuses which has a cylindrical shape and comprises a thrust bearing face which forms a thrust bearing gap between itself and the rotational member to be supported and a sealing face which forms a sealing space between itself and the rotational member, the method comprising a step of forming the outer circumferential surface of the housing by forging and then forming the inner circumferential surface by forging.

In the housing in the shape of a cylinder, for example, its thrust bearing face side is often formed to be thicker than the side opposite to the thrust bearing face (the side opposite to the thrust bearing face) to ensure the thrust bearing area or for other purposes. In this case, for example, if the outer circumferential surface is formed by forging after the inner circumferential surface of the housing is formed by forging, the hole formed earlier on the inner periphery is deformed, and the accuracy of this hole may not be maintained any longer. In addition, it may be difficult to mold the thick wall part. In contrast, as in the present invention, if the inner circumferential surface is formed by forging after the outer circumferential surface of the housing is formed by forging, such problems can be overcome so that the thrust bearing face can be formed very accurately. Moreover, since these are molded by forging, reduction of the cycle time, material cost reduction resulting from an increase in the ratio of the amount of materials after a molding process to that prior to the process, etc., can be achieved unlike in machining such as lathe turning. Moreover, unlike in machining such as lathe turning, no cutting powder is produced, and the production of burrs can be suppressed. Therefore, further cost reduction can be achieved by simplifying the cleaning operation and eliminating the trouble of removing burrs.

The forging of the inner circumferential surface of the housing is normally carried out by perforating a housing material in the axial direction. At this time, it is preferred to perforate the housing material in the axial direction from the side opposite to the thrust bearing face toward the thrust bearing face side. According to this method, deformation of the thrust bearing face side due to perforating can be decreased. Therefore, the inner circumferential surface can be formed, while the shape of the outer circumferential surface formed earlier can be maintained very accurately.

A housing for hydrodynamic bearing apparatuses produced by the procedure described above can be provided, for example, as that having excellent accuracy of form (perpendicularity, coaxiality, gradient) between the above faces constituting the housing.

The above housing can be so constituted that a hydrodynamic pressure producing part is formed on its thrust bearing face. In this case, the rotational member is supported in a non-contact support in the thrust direction by the hydrodynamic effect of the fluid produced in the thrust bearing gap between the thrust bearing face of the housing and the end face of the rotational member opposing this.

Moreover, the above housing may be so constituted that its both axial ends are open, and one end side is provided with the thrust bearing face and the other end is sealed with a lid member.

The housing having the above constitution can be provided as, for example, a hydrodynamic bearing apparatus having this housing. Moreover, this hydrodynamic bearing apparatus can be also presented as a motor comprising a hydrodynamic bearing apparatus.

As mentioned above, according to the present invention, a fluid lubrication bearing apparatus which can stably produce high bearing performance can be provided at low costs.

Moreover, according to the present invention, it is possible to process not only the thrust bearing face of the housing for hydrodynamic bearing apparatuses but also each face constituting the housing very accurately and manage the thrust bearing gap formed between the housing and the rotational member very accurately. Moreover, such processing costs can be reduced by employing forging as the process means at that time.

DETAILED DESCRIPTION OF THE INVENTION

A first embodiment of the present invention will be described below with reference to FIGS. 1 to 6.

Figure 1:
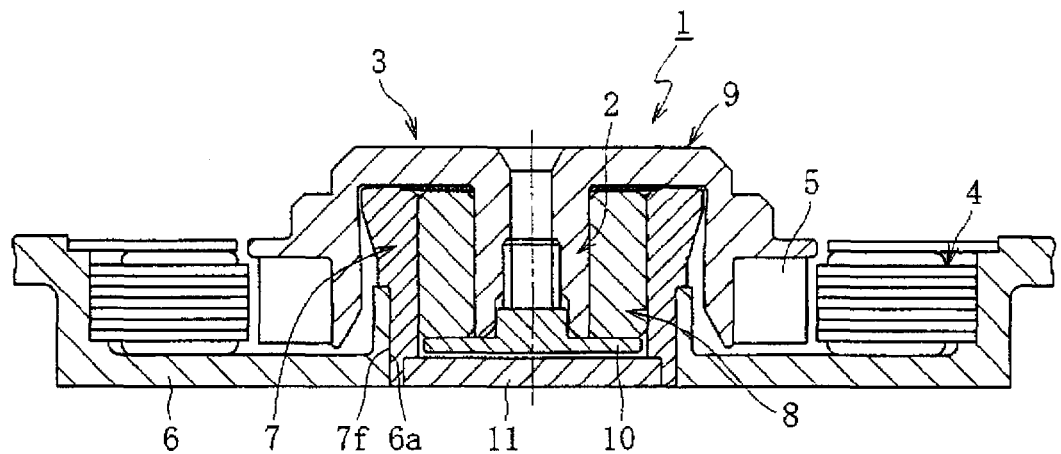
FIG. 1 shows a cross-sectional view of a spindle motor for information appliances integrating a fluid lubrication bearing apparatus according to the first embodiment of the present invention.

FIG. 1 conceptionally show a constitutional example of a spindle motor for information appliances integrating a fluid lubrication bearing apparatus 1 according to the first embodiment of the present invention. This spindle motor is used for disk drive units such as HDD, and comprises a fluid lubrication bearing apparatus 1 which rotatably supports a rotational member 3 comprising a shaft portion 2 in a non-contact support, for example, a stator coil 4 and a rotor magnet 5 which oppose each other across a gap in the radial direction, and a motor bracket 6. The stator coil 4 is attached on the outer periphery of the motor bracket 6, and the rotor magnet 5 is attached on the outer periphery of the rotational member 3. A housing 7 of the fluid lubrication bearing apparatus 1 is fixed onto the inner periphery of the motor bracket 6. Although not shown in the Fig., one or more of disk-shaped information recording media (hereinafter simply referred to as a disk.) such as a magnetic disk is retained on the rotational member 3. In the thus-constituted spindle motor, when the stator coil 4 is energized, the rotor magnet 5 is rotated by the electromagnetic force produced between the stator coil 4 and rotor magnet 5, and accordingly the rotational member 3 and the disk retained by the rotational member 3 rotate together with the shaft portion 2.

Figure 2:
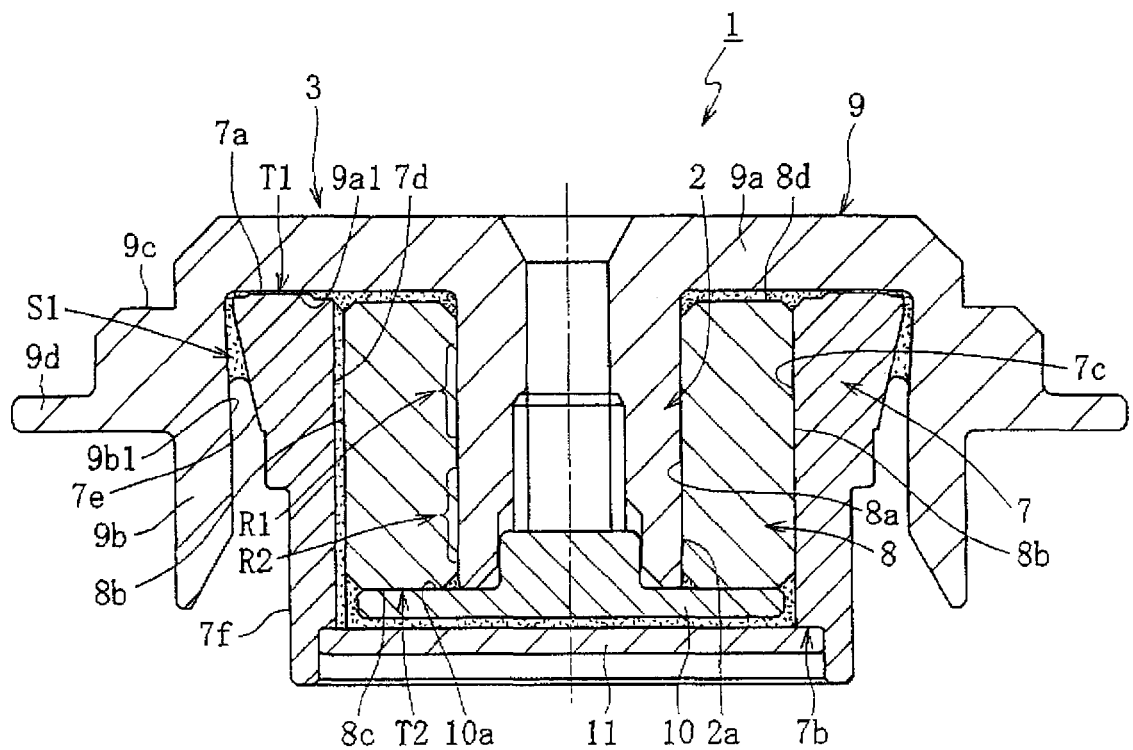
FIG. 2 shows a cross-sectional view of a fluid lubrication bearing apparatus.

FIG. 2 shows the fluid lubrication bearing apparatus 1. This fluid lubrication bearing apparatus 1 is constituted of the housing 7, a bearing sleeve 8 fixed onto the housing 7 and the rotational member 3 which rotates relative to the housing 7 and bearing sleeve 8 as main components. It should be noted that for the sake of explanation, in the opening portion of the housing 7 formed at both axial ends, the side sealed with a lid member 11 is referred to as the lower side, and the side opposite to the sealed side is referred to as the upper side in the description below.

The rotational member 3 is constituted of, for example, a hub portion 9 disposed on the opening side of the housing 7 and the shaft portion 2 inserted at the inner periphery of the bearing sleeve 8.

The hub portion 9 comprises a disk portion 9a covering the opening side (upper side) of the housing 7, a cylindrical portion 9b axially and downwardly extending from the outer circumference of the disk portion 9a, a disk loading face 9c and a brim 9d provided on the outer periphery of the cylindrical portion 9b. An unshown disk is fitted onto the outer periphery of the disk portion 9a and mounted on the disk loading face 9c. The disk is retained on the hub portion 9 by an unshown appropriate retaining means (clamper, etc.).

The shaft portion 2 is integrally formed with hub portion 9 from a resin or metal, and comprises a flange portion 10 separately at its lower end as a slip-off prevention. The flange portion 10 is made of a metal, and is, for example, fixed on the shaft portion 2 by means such as screw connection. It should be noted that the shaft portion 2 can be also formed separately from the hub portion 9. At that time, the shaft portion 2 and the hub portion 9 may be made of a metal and a resin, respectively, or may be the other way round.

The bearing sleeve 8 is, for example, cylindrically formed of a porous body comprising a metallic non-porous body or sintered metal. In this embodiment, it is cylindrically formed of a porous body of a sintered metal comprising copper as a main ingredient.

Figure 3:
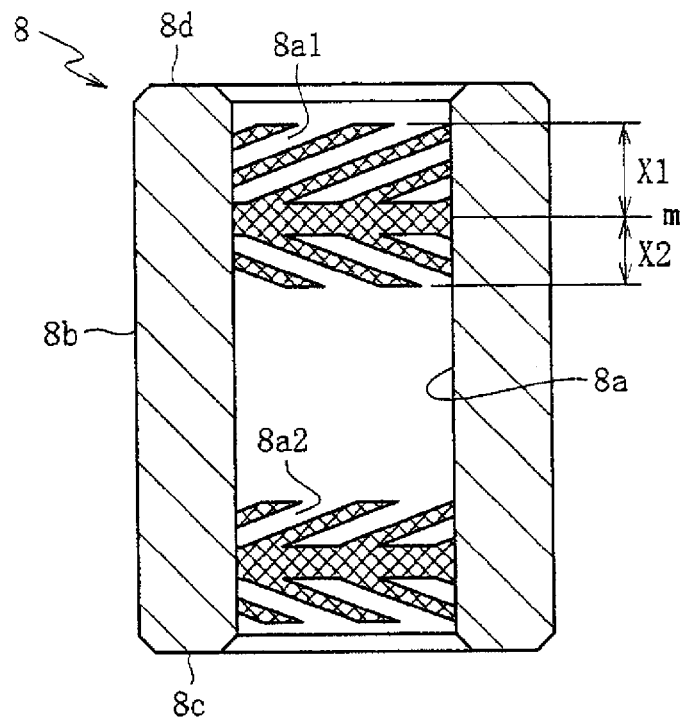
FIG. 3 shows a longitudinal sectional view of the bearing sleeve.

Hydrodynamic grooves are formed on the entire or part of the cylindrical region of the inner circumferential surface 8a of the bearing sleeve 8 as a radial hydrodynamic pressure producing part. In this embodiment, for example, as shown in FIG. 3, two regions in which a plurality of hydrodynamic grooves 8a1, 8a2 are arranged in a herringbone shape are formed in axially separate positions. In the region where upper hydrodynamic grooves 8a1 are formed, the hydrodynamic grooves 8a1 are formed axially asymmetrically relative to the axial center m (the axial center of the region between the upper and lower slanted grooves), and the axial dimension X1 of the region above the axial center m is larger than the axial dimension X2 of the region below the center m.

In the entire or part of the annular region of the lower end face 8c of the bearing sleeve 8, as a thrust hydrodynamic pressure producing part, for example, a region in which a plurality of hydrodynamic grooves are arranged in a spiral shape is formed, although not shown in the Fig. This region in which the hydrodynamic grooves are formed opposes the upper end face 10a of the flange portion 10 as a thrust bearing face. When the shaft portion 2 (rotational member 3) is in rotation, the thrust bearing gap of a second thrust bearing portion T2 described later is formed between the region in which the hydrodynamic grooves are formed and the upper end face 10a (refer to FIG. 2).

Figure 4:
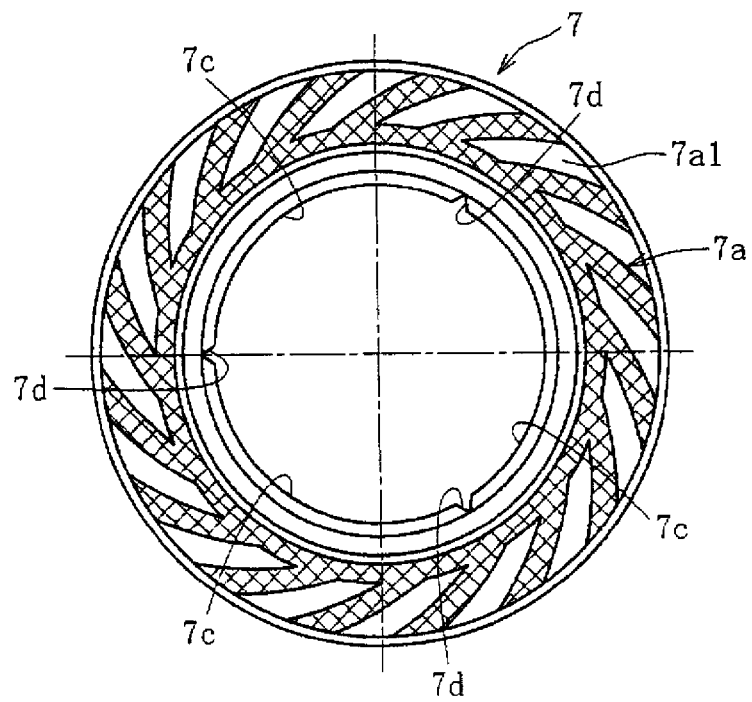
FIG. 4 shows the upper end face of the housing.

The housing 7 is formed, for example, of a metallic material such as stainless steel in a cylindrical shape. This housing 7 is in a shape whose both axial ends are open, and its one end side (lower end side) is sealed with the lid member 11. A thrust bearing face 7a is provided in the entire or part of the annular region of the end face (upper end face) on the opening side. In this embodiment, for example, as shown in FIG. 4, a region in which a plurality of hydrodynamic grooves 7a1 are arranged in a spiral shape is formed on the thrust bearing face 7a as a thrust hydrodynamic pressure producing part. This thrust bearing face 7a (the region in which the hydrodynamic grooves 7a1 are formed) opposes the lower end face 9a1 of the disk portion 9a of the hub portion 9. When the rotational member 3 is in rotation, a thrust bearing gap of a first thrust bearing portion T1 described later is formed between the thrust bearing face 7a and the lower end face 9a1 (refer to FIG. 2).

The lid member 11 sealing the lower end side of the housing 7 is formed of a metallic material or resin material and is fixed onto a shoulder 7b provided on the inner periphery side of the lower end of the housing 7. Herein, a fixing means is not particularly limited. For example, means such as adhesion (including loose adhesion and press fitting adhesion), press fitting, weld adhesion (for example, ultrasonic welding), welding (for example, laser welding) can be suitably selected depending on the combination of materials and required mounting strength, sealing performance, etc.

On the inner periphery of the housing 7, a fixing face 7c for fixing the outer circumferential surface 8b of the bearing sleeve 8 is formed. On this fixing face 7c, the outer circumferential surface 8b of the bearing sleeve 8 is fixed, for example, by means of adhesion (including loose adhesion and press fitting adhesion), press fitting, weld adhesion or other suitable means.

Moreover, circulation grooves 7d extending in the axial direction are formed on the inner periphery of the housing 7, in addition to the fixing face 7c. In this embodiment, the circulation grooves 7d are formed in three positions at regular intervals in the circumferential direction as shown in FIG. 4. In the state that the bearing sleeve 8 is fixed on the fixing face 7c, their lower ends are in circulation with the lower end face 8c of the bearing sleeve 8, and their upper ends are in circulation with the upper end face 8d of the bearing sleeve 8. Furthermore, the upper ends of the circulation grooves 7d are also in circulation with the thrust bearing gap of the first thrust bearing portion T1 (refer to FIG. 2 for both).

A tapered face 7e whose diameter gradually increases upwardly is formed on the outer periphery of the housing 7. This tapered face 7e forms an annular sealing space S1 whose dimension in the radial direction gradually decreases from the sealed side of the housing 7 towards the top between itself and the inner circumferential surface 9b1 of the cylindrical portion 9b. This sealing space S1 is in circulation with the outer diameter side of the thrust bearing gap of the first thrust bearing portion T1 while the shaft portion 2 and hub portion 9 are in rotation.

Moreover, a cylindrical outer circumferential surface 7f having a constant diameter is formed at the lower end of the outer periphery of the housing 7. This cylindrical outer circumferential surface 7f is fixed on the inner circumferential surface 6a of the motor bracket 6 by means of adhesion, press fitting or other means, whereby the fluid lubrication bearing apparatus 1 is integrated into the motor.

An example of methods for producing the housing 7 constituting the fluid lubrication bearing apparatus 1 is described below with reference to FIGS. 5 and 6.

In this embodiment, the housing 7 is produced in these three steps: a step of molding the outer circumferential surface (A); a step of molding the inner circumferential surface (B); and a step of molding the thrust bearing face (C).

(A) Step of Molding the Outer Circumferential Surface
Firstly, a columnar blank material prepared by straightening a wire and cutting it into a suitable length is cold-forged (compressed) in a pair of unshown molds, forming the outer circumferential surface (tapered face 7e and cylindrical outer circumferential surface 7f) of the housing 7. It should be noted that examples of usable cold forging methods include, not only the upsetting mentioned above, but also forward extrusion, combination of forward extrusion and upsetting and various other molding methods.

(B) Step of Molding the Inner Circumferential Surface
Secondly, the inner circumferential surface (fixing face 7c and circulation grooves 7d) of the housing 7 to be formed by cold-forging of the housing material 7' is formed. As shown in FIG. 5, the used mold is constituted of, for example, a die 16 which binds the outer circumferential surface of the housing material 7', an upper punch 7' which binds the housing material 7' in the axial direction from the side of the thrust bearing face 7a to be formed, and a lower punch (rod) 18 having a molded surface 18a corresponding to the inner circumferential surface of the housing 7 to be formed provided on its outer periphery. Herein, the molded surface 18a of the rod 18 forming the lower punch comprises, as shown in FIG. 6, a face molding portion 18a1 corresponding to the fixing face 7c and a raised groove molding portion 18a2 corresponding to the circulation grooves 7d, each in a plurality of positions (in this shown examples, three positions each regularly spaced in the circumferential direction). The groove molding portion 18a2 is provided so that it extends parallel to the direction of the stroke of the rod 18 (vertical direction in FIG. 5).

Figure 5:
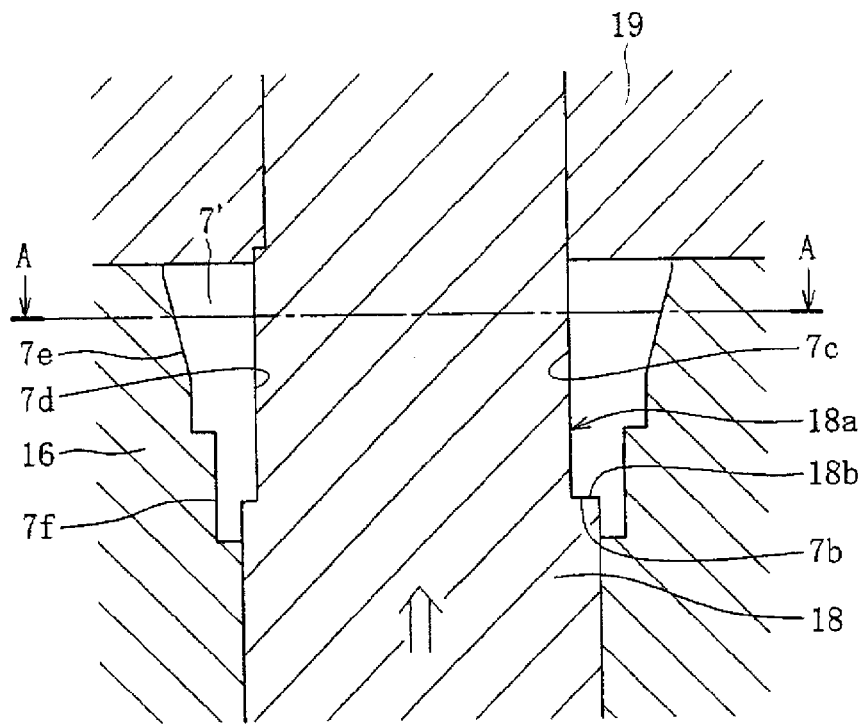
FIG. 5 is a schematic diagram showing an example of manufacturing processes of the housing.
Figure 6:
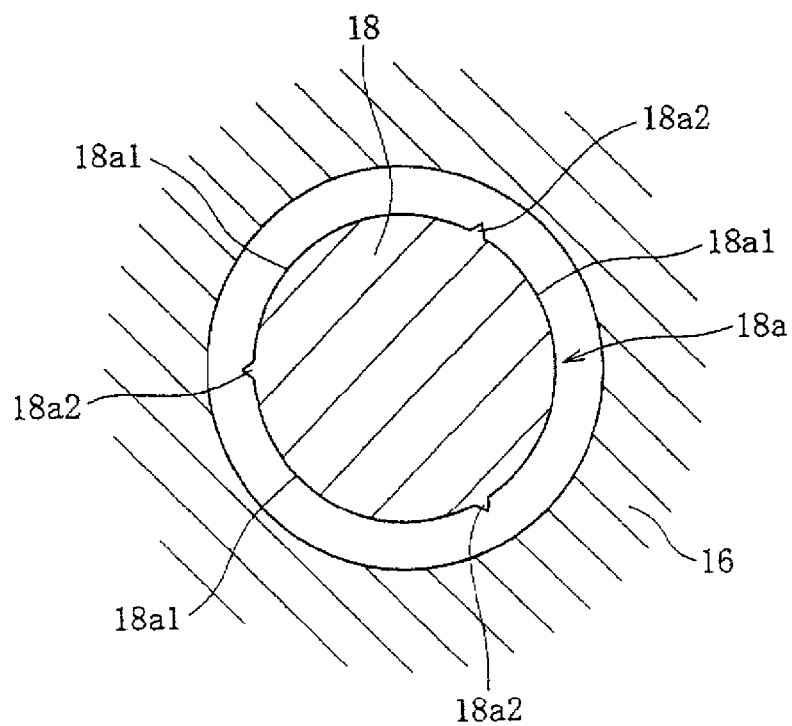
FIG. 6 is a cross-sectional view of a forging mold taken along the line A-A.

As in FIG. 5, in the state that the housing material 7' is bound in the radial direction and in the axial direction, the rod 18 is elevated (in the direction of the arrow in the Fig.), to perforate the inner peripheral portion of the housing material 7' from the lower end side towards the upper end side. This causes the housing material 7'' to open at both ends in the axial direction so that its inner periphery is formed in a shape copying the face molding portion 18a1 and groove molding portion 18a2 (the fixing face 7c and circulation grooves 7d of the finished product) of the molded surface 18a. In this embodiment, the fixing face 7c and circulation grooves 7d of the finished product are formed simultaneously with the shoulder 7b by using the rod 18 having a shoulder molding portion 18b corresponding to the shoulder 7b in addition to the molded surface 18a. It should be noted that in this embodiment, the case where the inner circumference of the housing material 7' is perforated from the downside (the side opposite to the side of the thrust bearing face 7a) to the upside (the side of the thrust bearing face 7a) is described. However, for example, if there is no part which particularly specifies the perforating direction such as the shoulder 7b, it may be perforated from the upside to the downside.

(C) Step of Molding the Thrust Bearing Face

After the steps of (A), (B) mentioned above, the thrust bearing face 7a of the housing 7 to be formed is formed by cold-forging the housing material 7'. In this molding step, the used mold is constituted of, for example, the die 16 and rod 18 shown in FIG. 5 and the lower end face of the upper punch 19 which are caused to be a molded surface corresponding to the thrust bearing face 7a of the housing 7 to be formed, although not shown in the Fig. In the state that the housing material 7' is bound by the die 16 and rod 18 in the radial direction, the upper punch 19 is lowered, and the molded surface (not shown) of the upper punch 19 is pushed against the upper end of the housing material 7' by applying a predetermined pressure. Accordingly, the upper end face of the housing material 7' is formed into a shape copying the molded surface (the thrust bearing face 7a of the finished product). Moreover, in this embodiment, although not shown in the Fig., a hydrodynamic pressure producing part in which a groove pattern corresponding to hydrodynamic grooves 7a1 is formed in advance on the molded surface of the upper punch 19 is used, whereby the thrust bearing face 7a and the shape of the hydrodynamic grooves 7a1 are formed on the housing material 7' simultaneously.

After the steps (A) to (C) mentioned above, the housing 7 as the finished product (refer to FIG. 2) is formed.

The inside of the fluid lubrication bearing apparatus 1, including inner pores (the pores of the porous body organization) of the bearing sleeve 8, is filled with a lubricating oil (dotted region in FIG. 2). The oil level of the lubricating oil is always maintained within a sealing space S1.

While the shaft portion 2 (rotational member 3) is in rotation, a region which serves as the radial bearing face of the face 8a of the inner periphery of the bearing sleeve 8 (the region where the hydrodynamic grooves 8a1, 8a2 are formed in two upper and lower positions) opposes the outer circumferential surface 2a of the shaft portion 2 across the radial bearing gap. In addition, as the shaft portion 2 rotates, the lubricating oil in of the above radial bearing gap is pushed towards the side of the axial center m of the hydrodynamic grooves 8a1, 8a2, and its pressure is increased. A first radial bearing portion R1 and a second radial bearing portion R2 which support the shaft portion 2 in a non-contact support by such a hydrodynamic effect of the hydrodynamic grooves are constituted respectively.

At the same time, an oil film of the lubricating oil is formed in each of the thrust bearing gap between the thrust bearing face 7a of the housing 7 (the region where the hydrodynamic grooves 7a1 are formed) and the lower end face 9a1 of the hub portion 9 opposing this (disk portion 9a), and the thrust bearing gap between the lower end face 8c of the bearing sleeve 8 (the region where the hydrodynamic grooves are formed) and the upper end face 10a of the flange portion 10 opposing this, by the hydrodynamic effect of the hydrodynamic grooves. In addition, the first thrust bearing portion T1 and second thrust bearing portion T2 which support the rotational member 3 in the thrust direction in a non-contact support are constituted by the pressure of these oil films.

As mentioned above, the axial circulation grooves 7d are provided on the inner periphery of the housing 7, whereby the thrust bearing gap of the second thrust bearing portion T2 positioned inside the lower end of the housing 7 and the sealing space S1 formed at the opening side of the housing 7 are brought into circulation through these circulation grooves 7d. Accordingly, for example, the event of an excessive increase or decrease in the fluid (lubricating oil) pressure on the side of the second thrust bearing portion T2 for any reason can be avoided, enabling to stably support the rotational member 3 in the thrust direction in a non-contact support.

Moreover, in this embodiment, since the hydrodynamic grooves 8a1 of the first radial bearing portion R1 are formed asymmetrically (X1>X2) in the axial direction with respect to the axial center m (refer to FIG. 3), while the shaft portion 2 is in rotation, the drawing force (pumping force) of the lubricating oil by the hydrodynamic grooves 8a1 in the upper region becomes relatively greater than that of the lower region. Because of the differential pressure of this drawing force, the lubricating oil filling the gap between the face 8a on the inner periphery of the bearing sleeve 8 and the outer circumferential surface 2a of the shaft portion 2 flows downwardly, and circulates through the channel of the thrust bearing gap of the second thrust bearing portion T2→the circulation grooves 7d→the gap in the axial direction between the upper end face 8d and lower end face 9a1, to be drawn into the radial bearing gap of the first radial bearing portion R1 again. As mentioned above, by giving such a constitution that the axial circulation grooves 7d are provided on the inner periphery of the housing 7 and the lubricating oil is caused to flow and circulate through the inner space of the housing 7, the pressure balance within the bearing including the bearing gaps is appropriately maintained. Moreover, an undesired flow of the lubricating oil through the inner space of the bearing, for example, the phenomenon that the pressure of the lubricating oil becomes locally negative, can be prevented and the formation of bubbles associated with the occurrence of the negative pressure, leakage of the lubricating oil resulting from the formation of bubbles, occurrence of vibration or like problems can be overcome.

Although the first embodiment of the present invention is described above, the present invention is not limited to this embodiment, and can be applied to other constitutions.

Figure 7:
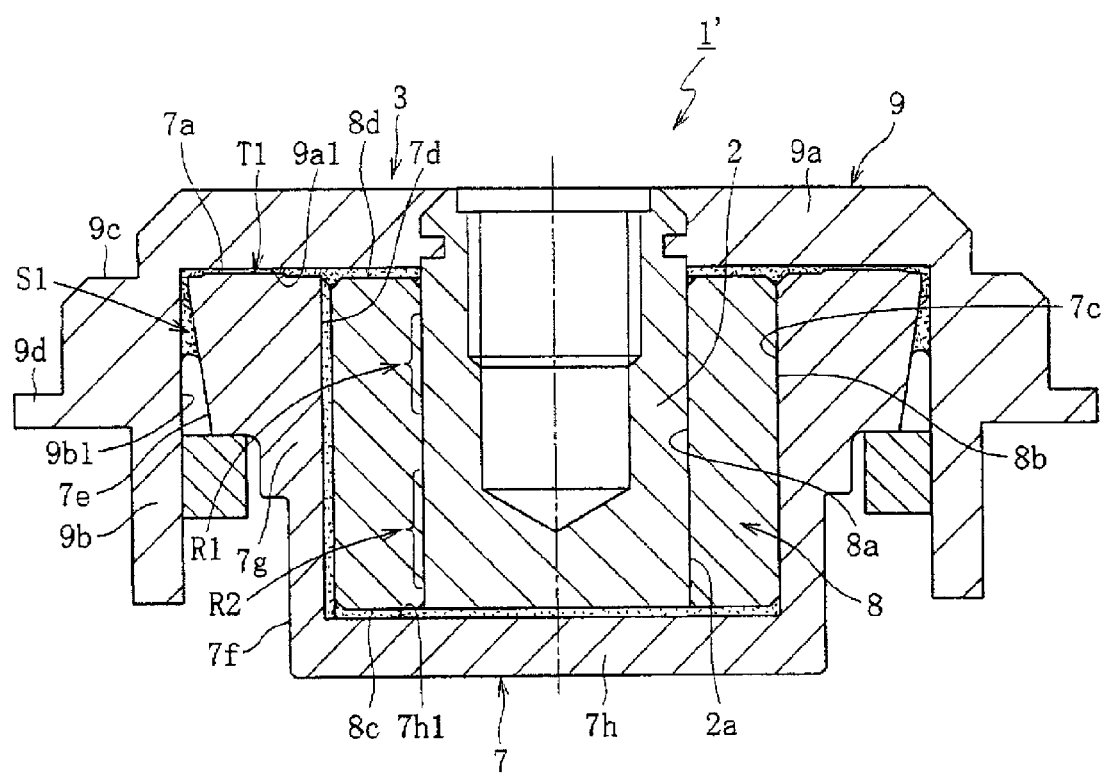
FIG. 7 is a cross-sectional view of a fluid lubrication bearing apparatus according to the second embodiment of the present invention.

FIG. 7 shows a fluid lubrication bearing apparatus 1' according to a second embodiment. The constitution of the fluid lubrication bearing apparatus 1' in this Fig. differs from that of the fluid lubrication bearing apparatus 1 of the first embodiment in that the shape of the shaft portion 2 has a constant diameter and that the housing 7 is a bottomed cylinder. Accordingly, the thrust bearing gap is formed only between the thrust bearing face 7a provided at a side portion 7g of the housing 7 and the lower end face 9a1 of the hub portion 9 opposing this. It should be noted that the parts and components having the same constitution and function as in the first embodiment are referred to by the same reference numerals and relevant explanation is eliminated below.

The housing 7 constituting the above-mentioned fluid lubrication bearing apparatus 1' comprises a cylindrical side portion 7g provided with the thrust bearing face 7a at its upper end and a bottom 7h provided at the lower end of the side portion 7g. The side portion 7g and bottom 7h are integrally formed by forging.

Also in this embodiment, the lubricating oil is caused to flow and circulate through the inner space of the housing 7 via the axial circulation grooves 7d provided on the inner periphery of the housing 7. That is, the lubricating oil between the face 8a of the inner periphery of the bearing sleeve 8 and the outer circumferential surface 2a of the shaft portion 2 flows downwardly, and circulates through the channel of the gap in the axial direction between the lower end face 8c of the bearing sleeve 8 and the upper end face 7h1 of the bottom 7h→circulation grooves 7d→the gap in the axial direction between the upper end face 8d and the lower end face 9a1, to be drawn into the radial bearing gap of the first radial bearing portion R1 again. Accordingly, the pressure balance within the bearing including the bearing gaps is appropriately maintained.

Figure 8:
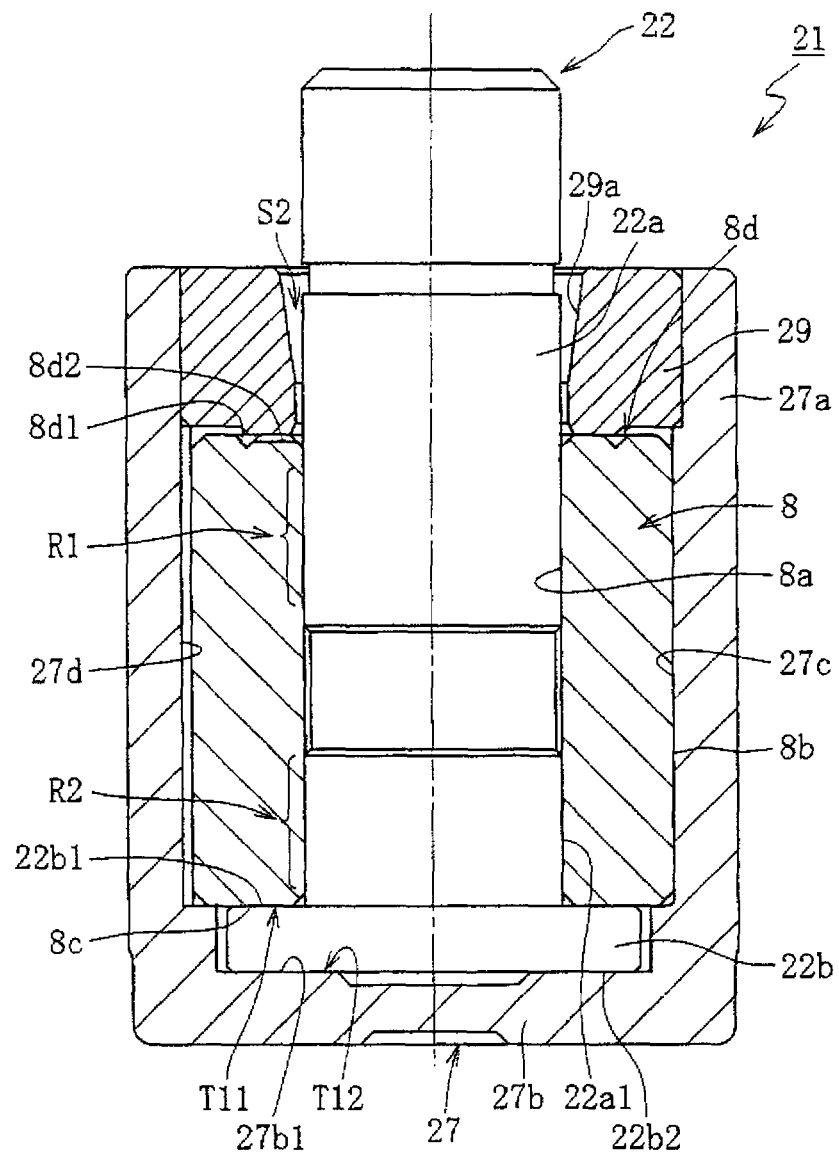
FIG. 8 is a cross-sectional view of a fluid lubrication bearing apparatus according to the third embodiment of the present invention.

FIG. 8 shows a fluid lubrication bearing apparatus 21 according to a third embodiment. In this embodiment, a rotational member 22 comprises a shaft portion 22a and a flange portion 22b provided integrally or separately at the lower end of the shaft portion 22a. A sealing member 29 in an approximately cylindrical shape is fixed on the inner periphery of the upper end portion of the housing 27. This sealing member 29 forms a sealing space S2 whose radial dimension gradually increases towards the top between its inner circumferential surface 29a and the outer circumferential surface 22a1 of the shaft portion 22a opposing this.

The housing 27 is a metallic forged article having an integral structure of a cylindrical side portion 27a and a side portion 27a, and comprises a bottom 27b positioned at the lower edge of the side portion 27a. Although not shown in the Fig., hydrodynamic grooves are formed, for example, in a spiral shape on the upper end face 27b1 of the bottom 27b of the housing 27, as the thrust bearing face. Moreover, a circumferential groove 8d1 demarcating the upper end face 8d in the radial direction is formed on the upper end face 8d of the bearing sleeve 8 throughout its circumference, and a plurality of radial grooves 8d2 are formed from this circumferential groove 8d1 towards the inner periphery side.

While the rotational member 22 is in rotation, the thrust bearing gap of a thrust bearing portion T11 is formed between the lower end face 8c of the bearing sleeve 8 and the upper end face 22b1 of the flange portion 22b, and the thrust bearing gap of the thrust bearing portion T12 is formed between the upper end face 22b1 of the bottom 27b of the housing 27 and the lower end face 22b2 of the flange portion 22b.

Also in this embodiment, the lubricating oil is caused to flow and circulate through the inner space of the housing 27 via the circulation grooves 27d provided on the inner periphery of the housing 27. That is, the lubricating oil between the inner periphery of the bearing sleeve 8 face 8a and the outer circumferential surface 22a1 of the shaft portion 22a flows downwardly, and circulates through the channel of the gap in the axial direction between the lower end face 8c of the bearing sleeve 8 and the upper end face 27b1 of the bottom 27b→the hydrodynamic grooves of the lower end face 8c of the bearing sleeve 8→circulation grooves 27d→the circumferential groove 8d1 and radial groove 8d2 of the upper end face 8d of the bearing sleeve 8, to be drawn into the radial bearing gap of the first radial bearing portion R1 again. Accordingly, the pressure balance within the bearing including the bearing gaps is appropriately maintained.

Figure 9:
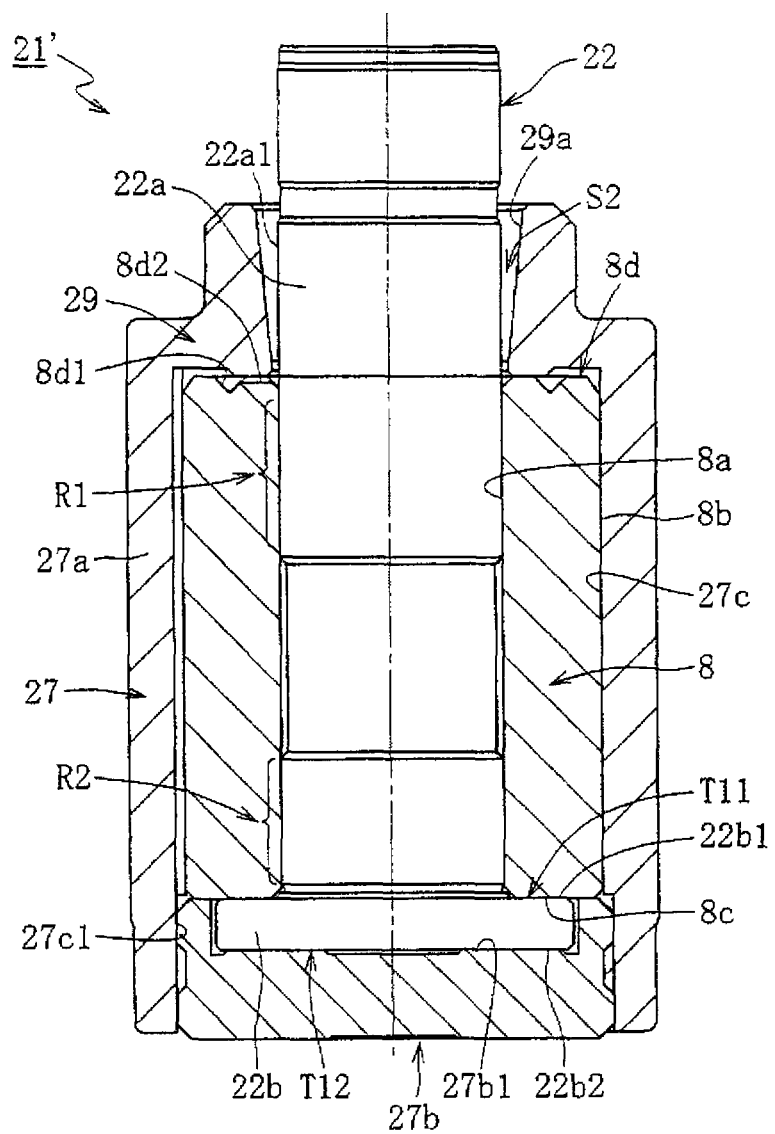
FIG. 9 is a cross-sectional view of a fluid lubrication bearing apparatus according to the fourth embodiment of the present invention.

FIG. 9 shows a fluid lubrication bearing apparatus 21' according to a fourth embodiment. The constitution of the fluid lubrication bearing apparatus 21' in this Fig. differs from that of the fluid lubrication bearing apparatus 1 of the third embodiment in that the sealing member 29 is formed integrally with the side portion 27a of the housing 27, and the bottom 27b of the housing 27 is separate from the side portion 27a and this is fixed on the inner circumferential surface 27c1 of the lower end of the side portion 27a. It should be noted that the parts and components having the same shape and function as the third embodiment are referred to by the same numerals and relevant explanation is eliminated.

Also in this embodiment, the lubricating oil is caused to flow and circulate through the inner space of the housing 27 via the circulation grooves 27d provided on the inner periphery of the housing 27. Therefore, the pressure balance within the bearing including the bearing gaps is appropriately maintained.

Moreover, although not shown in the Fig., the present invention can be also applied to such a constitution that the housing 27 is opened at both ends and the sealing member 29 and bottom 27b are separately formed which are fixed on the inner periphery at the upper end and the inner periphery at the lower end of the housing 27, respectively.

In the embodiments described above (first to fourth embodiments), the case where the housing 7 (27) is formed by forging, for example, of a relatively rigid metal such as stainless steel is shown as an example. However, the present invention can be also applied to other cases where it is formed by forging, for example, of a relatively soft metal such as brass as well.

Moreover, in the embodiments exemplified above, the axial circulation grooves 7d (27d) formed on the inner periphery of the housing 7 (27) have a triangle cross sections, but other groove shapes (the shapes of the cross sections of the grooves) are of course usable. This is because the inner periphery of the circulation grooves 7d (27d) formed by forging serves as a plastic working/plastic processing face, and its surface roughness is good, and therefore smooth circulation of the fluid within the circulation grooves 7d (27d) can be ensured even if the difference in the shape of the cross section produces a difference in the ease of flow of the lubricating oil. Moreover, the number of the circulation grooves 7d (27d) is not limited to three as shown in the Fig. for a similar reason, and may be two, four or more of them can be provided.

Moreover, in the embodiments described above, a hydrodynamic pressure producing part (for example, hydrodynamic grooves 8a1, 8a2) for producing the hydrodynamic effect of the fluid in each bearing gap is provided on the component side opposing the rotational member 3 in each bearing gap, but it can be also provided on the side of the rotational member 3. For example, the region where the hydrodynamic grooves 8a1, 8a2 are formed provided on the face 8a of the inner periphery of the bearing sleeve 8 and the region where the hydrodynamic grooves are formed provided on the lower end face 8c can be also provided on the outer circumferential surface 2a of the opposing shaft portion 2 (22a) and the upper end face 10a of the flange portion 10 (22b). Accordingly, the entire surface of the bearing sleeve 8 can be made a smooth surface, and molding part corresponding to the circulation grooves 7d, hydrodynamic grooves 8a1, etc. need not be provided in the forming mold, enabling further simplification and cost reduction of the mold.

Moreover, in the embodiments described above, as a hydrodynamic bearing constituting the radial bearing portions R1, R2 and thrust bearing portions T1, T2, an exemplary bearing in which the hydrodynamic pressure producing part comprising the hydrodynamic grooves, for example, in a herringbone shape or a spiral shape is used, but the constitution of the hydrodynamic pressure producing part is not limited to this. Examples of the radial bearing portions R1, R2 include a multilobe bearing, step bearing, taper bearing, taper flat bearing or the like.

Moreover, although not shown in the Fig., one or both of the thrust bearing portions T1, T2 can be also constituted of bearing comprising, for example, a plurality of hydrodynamic grooves in the shape of a radial groove provided at predetermined intervals in the circumferential direction i.e., so-called step bearings, so-called wave bearings (in which the steps are in the shape of a wave) or the like, in a region which serves as the thrust bearing face.

Moreover, in the embodiments described above, the case where radial bearing portions R1, R2 and thrust bearing portions T1, T2 are constituted of hydrodynamic bearings is described, but they may be constituted of other bearings. For example, a so-called cylindrical bearing can be constituted of the face 8a of the inner periphery of the bearing sleeve 8 which serves as a radial bearing face is made a perfectly circular inner circumferential surface without a hydrodynamic pressure producing part such as the hydrodynamic grooves 8a1, 8a2, and the outer circumferential surface 2a in the shape of a perfect circle of the shaft portion 2 opposing this inner circumferential surface. Alternatively, the thrust bearing portions T1, T2 can be also constituted of pivot bearings. Of course, such a constitution of the thrust bearing portions T1, T2 mentioned above can be also applied to the thrust bearing portions T11, T12 as well.

Moreover, in the embodiments described above, the lubricating oil is shown as an example as a fluid for filling the inside of the fluid lubrication bearing apparatus 1 (21) and forming a lubricating film in the radial bearing gap between the bearing sleeve 8 and shaft portion 2 and the thrust bearing gap between the bearing sleeve 8 and shaft portion 2 or between the housing 7 and rotational member 3 (hub portion 9). However, other fluids which can form a lubricating film in each bearing gap, for example, gases such as air, lubricants or lubricating greases having fluidity such as a magnetic fluid, among others, can be used.

A fifth embodiment of the present invention is described below with reference to FIG. 10 to FIG. 13.

Figure 10:
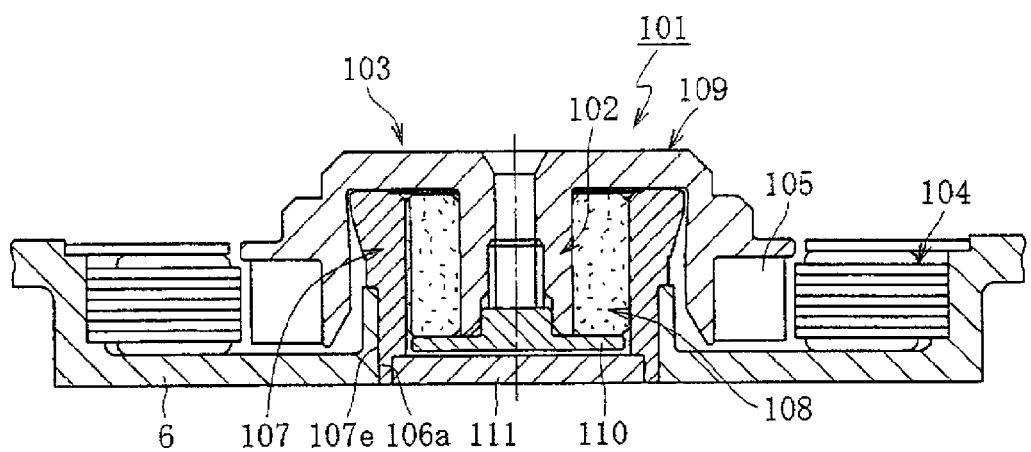
FIG. 10 is a cross-sectional view of a spindle motor for information appliances integrating a hydrodynamic bearing apparatus according to the fifth embodiment of the present invention.

FIG. 10 conceptually shows a constitutional example of a spindle motor for information appliances integrating a hydrodynamic bearing apparatus 101 according to the fifth embodiment of the present invention. This spindle motor is for use in a disk drive unit such as HDD, a hydrodynamic bearing apparatus 101 which rotatably supports a rotational member 103 comprising a shaft portion 102 in a non-contact support, for example, a stator coil 104 and rotor magnet 105 which oppose across a gap in the radial direction, and a motor bracket 106. The stator coil 104 is attached on the outer periphery of the motor bracket 106, the rotor magnet 105 is attached to the outer periphery of the rotational member 103. The housing 107 of the hydrodynamic bearing apparatus 101 is fixed to the inner periphery of the motor bracket 106. One or a plurality of disk-shaped information recording media (hereinafter simply referred to as a disk.) such as magnetic disks are retained on the rotational member 103. In the thus constituted spindle motor, when the stator coil 104 is energized, the rotor magnet 105 is rotated by the electromagnetic force produced between the stator coil 104 and rotor magnet 105. Accordingly, a disk D retained by the rotational member 103 and rotational member 103 are rotated together with the shaft portion 102.

Figure 11:
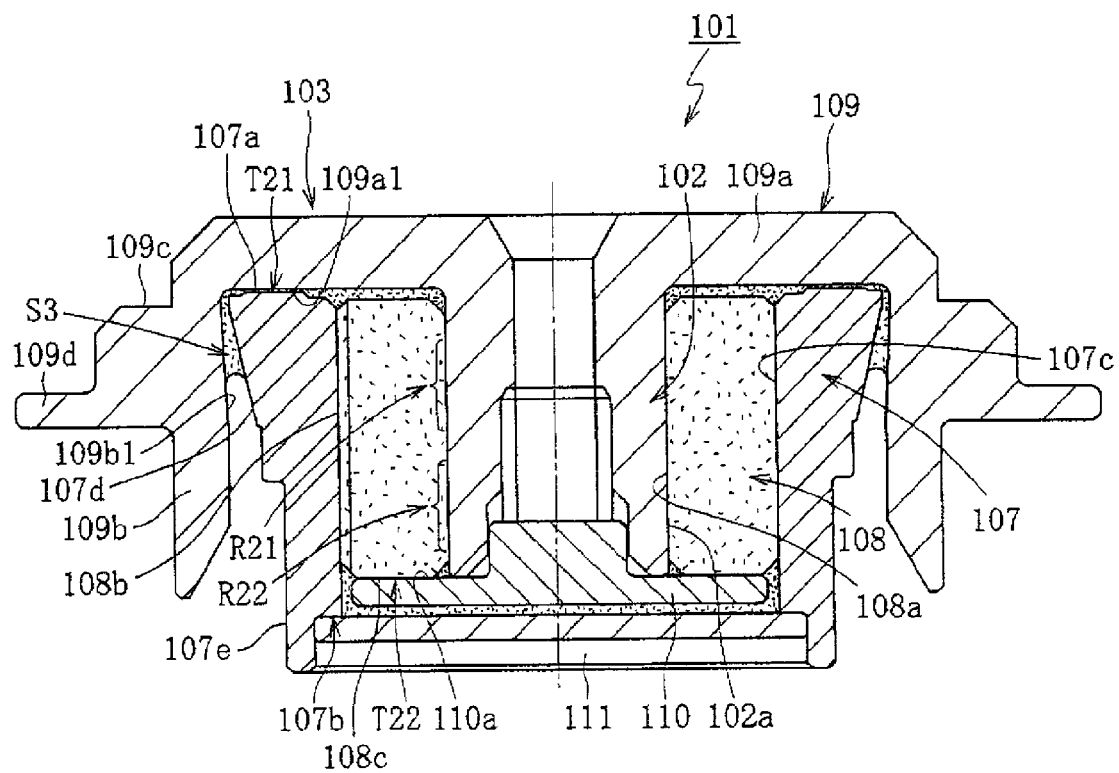
FIG. 11 is a cross-sectional view of a hydrodynamic bearing apparatus.

FIG. 11 shows the hydrodynamic bearing apparatus 101. This hydrodynamic bearing apparatus 101 is constituted of the housing 107, a bearing sleeve 108 fixed to the housing 107, and the rotational member 103 which rotates relative to the housing 107 and bearing sleeve 108 as main components. It should be noted that for the sake of explanation, the side sealed with a lid member 111 of the opening portions of the housing 107 formed at both axial ends is referred to as the lower side, and the side opposite to the sealed side is referred to as the upper side in the description below.

The rotational member 103 is constituted of, for example, a hub portion 109 which crowns the opening side of the housing 107 and the shaft portion 102 inserted at the inner periphery of the bearing sleeve 108.

The hub portion 109 comprises a disk portion 109a covering the opening side (upper side) of the housing 107, a cylindrical portion 109b extending downwardly in the axial direction from the outer circumference of the disk portion 109a, and a disk loading face 109c and brim 109d provided on the outer periphery of the cylindrical portion 109b. An unshown disk is fitted onto on the outer periphery of the disk portion 109a and mounted on the disk loading face 109c. In addition, the disk is retained on the hub portion 109 by an unshown appropriate retaining means (clamper, etc.).

The shaft portion 102 in this embodiment is integrally formed with the hub portion 109, and comprises a flange portion 110 separately at its lower end as a slip-off prevention. The flange portion 110 is made of a metal, and is fixed on the shaft portion 102 by means such as screw connection.

The bearing sleeve 108 is cylindrically formed, for example, of a porous body comprising a sintered metal, in particular a porous body of a sintered metal comprising copper as a main ingredient.

Figure 12:
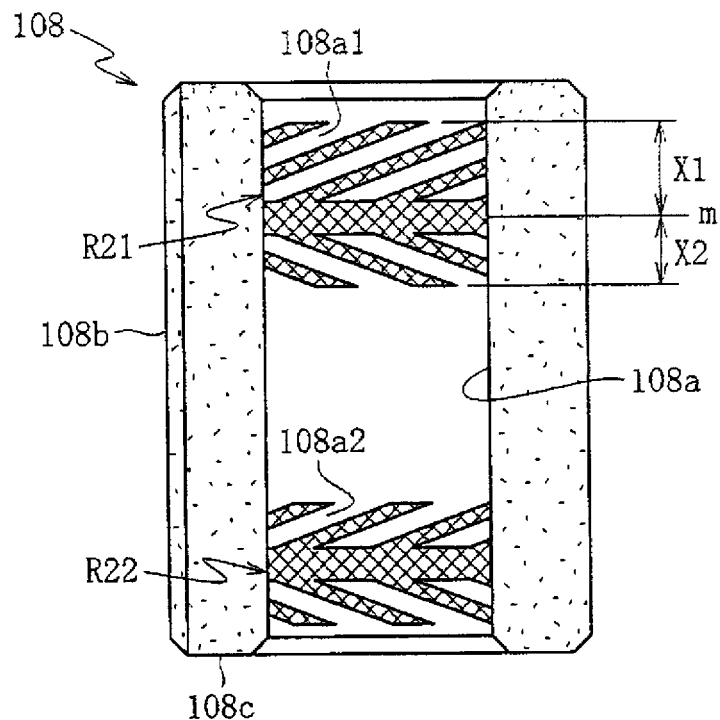
FIG. 12 is a longitudinal sectional view of a bearing sleeve.

Hydrodynamic grooves are formed on the entire or part of the cylindrical region of the inner circumferential surface 108a of the bearing sleeve 108 as a radial hydrodynamic pressure producing part. In this embodiment, for example, as shown in FIG. 12, two regions in which a plurality of hydrodynamic grooves 108a1, 108a2 are arranged in a herringbone shape are formed in axially separate positions. In the region where upper hydrodynamic grooves 108a1 are formed, the hydrodynamic grooves 108a1 are formed axially asymmetrically relative to the axial center m (the axial center of the region between the upper and lower slanted grooves), and the axial dimension X1 of the region above the axial center m is larger than the axial dimension X2 of the region below the center m.

In the entire or part of the annular region of the lower end face 108c of the bearing sleeve 108, although not shown in the Fig., for example, a region in which a plurality of hydrodynamic grooves are arranged in a spiral shape is formed as a thrust hydrodynamic pressure producing part. This region where the hydrodynamic grooves are formed opposes the upper end face 110a of the flange portion 110 and forms the thrust bearing gap of a second thrust bearing portion T22 between itself and the upper end face 110a when the shaft portion 102 (rotational member 103) is in rotation as the thrust bearing face (refer to FIG. 11).

Figure 13:
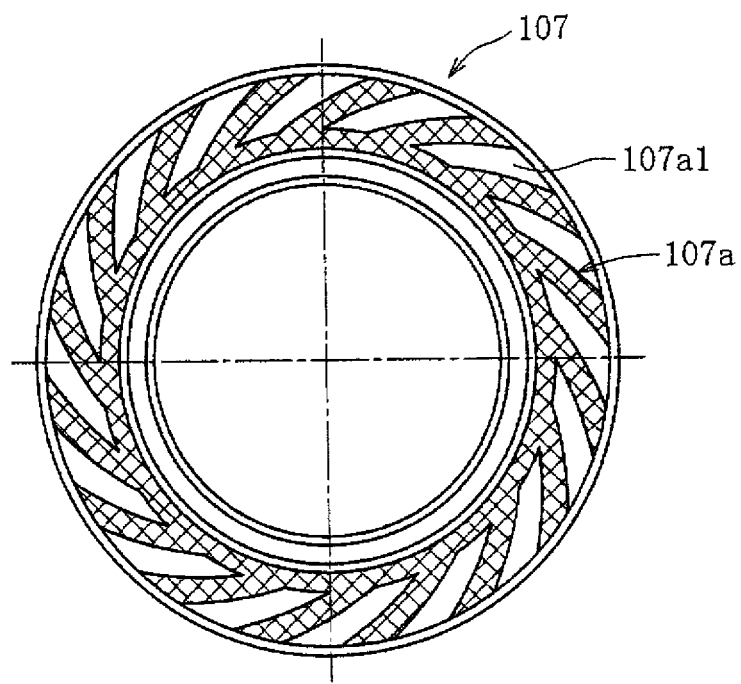
FIG. 13 shows the upper end face of the housing.

The housing 107 is, for example, cylindrically formed of a metallic material such as stainless steel. This housing 107 is in such a shape that its both axial ends are open, and the other end side is sealed by the lid member 111. In the entire or part of the annular region of the end face on one end side (upper end face), a thrust bearing face 107a is provided. In this embodiment, for example, as shown in FIG. 13, a region in which a plurality of hydrodynamic grooves 107a1 are arranged in a spiral shape is formed on the thrust bearing face 107a as a thrust hydrodynamic pressure producing part. This thrust bearing face 107a (the region in which the hydrodynamic grooves 107a1 are formed) opposes the lower end face 109a1 of the disk portion 109a of the hub portion 109, and when the rotational member 103 is in rotation, the thrust bearing gap of a first thrust bearing portion T21 described later is formed between itself and the lower end face 109a1 (refer to FIG. 11).

The lid member 111 sealing the other end side of the housing 107 is formed of a metallic material or resin material, and is fixed on a shoulder 107b provided on the inner periphery side of the other end of the housing 107. Herein, fixing means is not particularly limited, and, for example, means such as adhesion (including loose adhesion and press fitting adhesion), press fitting, weld adhesion (for example, ultrasonic welding), welding (for example, laser welding) can be suitably selected depending on the combination of materials and required mounting strength, sealing performance, etc.

The outer circumferential surface 108b of the bearing sleeve 108 is fixed on the inner circumferential surface 107c of the housing 107, for example, by means of adhesion (including loose adhesion and press fitting adhesion), press fitting, weld adhesion or other suitable means.

On the outer periphery of the housing 107, a tapering sealing face 107d whose diameter gradually increases towards the top is formed. Between this tapering sealing face 107d and the inner circumferential surface 109b1 of the cylindrical portion 109b, an annular sealing space S3 whose radial dimension gradually decreases from the sealed side of the housing 107 towards the top is formed. This sealing space S3 is in circulation with the outer diameter side of the thrust bearing gap of the first thrust bearing portion T21 when the shaft portion 102 and hub portion 109 are in rotation.

Moreover, at the lower end of the outer periphery of the housing 107, a cylindrical outer circumferential surface 107e having a constant diameter is formed. This cylindrical outer circumferential surface 107e is fixed on the inner circumferential surface 106a of the motor bracket 106 by means of adhesion, press fitting or other means. Accordingly, the hydrodynamic bearing apparatus 101 is integrated into the motor.

The inside of the hydrodynamic bearing apparatus 101, including the inner pores of the bearing sleeve 108 (the pores of the porous body organization), is filled with a lubricating oil. The oil level of the lubricating oil is always maintained within the sealing space S3.

When the shaft portion 102 (rotational member 103) is in rotation, the region which serves as a radial bearing face of the inner circumferential surface 108a of the bearing sleeve 108 (the region in which the hydrodynamic grooves 108a1, 108a2 are formed in two upper and lower positions) oppose the outer circumferential surface 102a of the shaft portion 102 across the radial bearing gap. In addition, as the shaft portion 102 rotates, the lubricating oil in of the above radial bearing gap is pushed towards the side of the axial center m of the hydrodynamic grooves 108a1, 108a2, and its pressure is increased. By a first radial bearing portion R21 and a second radial bearing portion R22 which support the shaft portion 102 in a non-contact support by such a hydrodynamic effect of the hydrodynamic grooves are constituted.

At the same time, an oil film of the lubricating oil is formed in each of the thrust bearing gap between the thrust bearing face 107a of the housing 107 (the region where the hydrodynamic grooves 107a1 are formed) and the lower end face 109a1 of the hub portion 109 opposing this (disk portion 109a), and the thrust bearing gap between the lower end face 108c (the region where the hydrodynamic grooves are formed) of the bearing sleeve 108 and the upper end face 110a of the flange portion 110 opposing this, by the hydrodynamic effect of the hydrodynamic grooves. In addition, the first thrust bearing portion T21 and the second thrust bearing portion T22 which support the rotational member 103 in the thrust direction in a non-contact support by the pressure of these oil films are constituted.

Figure 14:
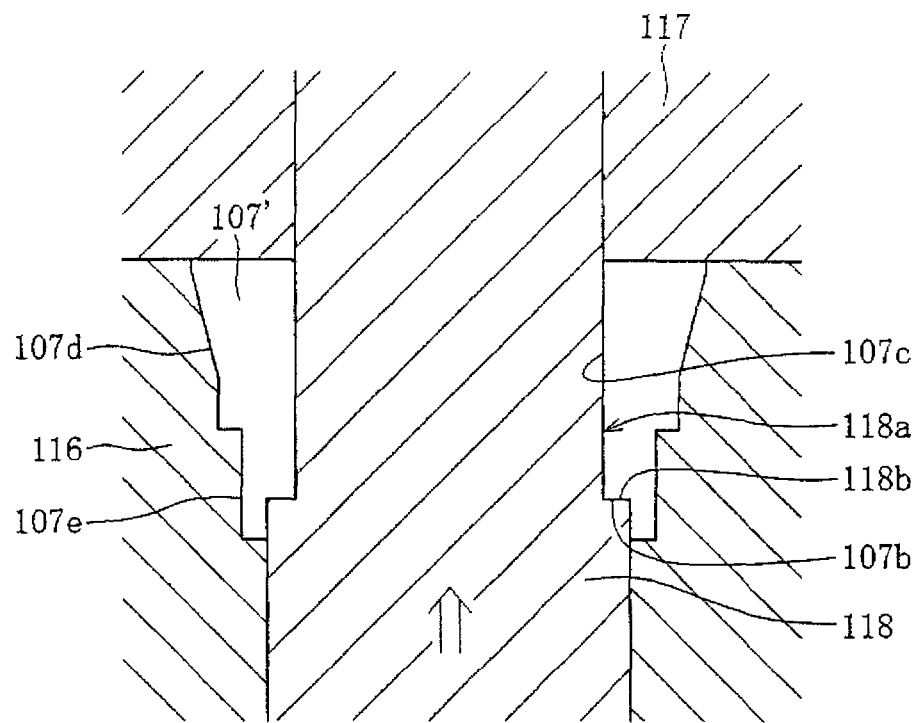
FIG. 14 is a schematic diagram showing an example of manufacturing processes of a housing.

An example of methods for producing the housing 107 constituting the hydrodynamic bearing apparatus 101 will be described below with reference to FIG. 14.

In this embodiment, the housing 107 is produced in these three steps: a step of molding the outer circumferential surface (D), a step of molding the inner circumferential surface (E), and a step of molding the thrust bearing face (F).

(D) Step of Molding the Outer Circumferential Surface

Firstly, a columnar blank material prepared by straightening a wire and cutting it into a suitable length is cold-forged (compressed) in a pair of unshown molds to form the outer circumferential surface (sealing face 107d and cylindrical outer circumferential surface 107e) of the housing 107. It should be noted that examples of usable cold forging methods include, not only the upsetting mentioned above, but also forward extrusion, combination of forward extrusion and upsetting and various other molding methods.

(E) Step of Molding the Inner Circumferential Surface

Secondly, the inner circumferential surface 107c of the housing 107 to be formed is formed by cold-forging a housing material 107' comprising the sealing face 107d and cylindrical outer circumferential surface 107e formed on the outer periphery. The used mold is constituted of, for example, as shown in FIG. 14, a die 116 which binds the outer circumferential surface of the housing material 107' and, an upper punch 107' which binds the housing material 107' from the side of the thrust bearing face 107a to be formed in the axial direction, and a lower punch (rod) 118 having a molded surface 118a corresponding to the inner circumferential surface 107c of the housing 107 to be formed provided on its outer periphery. As in the same Fig., in the state that the housing material 107' is bound in the radial and axial directions, a rod 118 is elevated (in the direction of the arrow in the Fig.), the inner circumference of the housing material 107' is perforated from the lower end side (the side opposite to the side of thrust bearing face 107a) towards the upper end side (the side of the thrust bearing face 107a). Accordingly, the housing material 107' opens at both ends in the axial direction, and its inner periphery is formed into a shape copying the molded surface 118a (the inner circumferential surface 107c of the finished product). in this embodiment, the inner circumferential surface 107c and shoulder 107b of the finished product are simultaneously formed by using the rod 118 having a molding part 118*b* corresponding to the shoulder 107*b* in addition to the molded surface 118*a* of the inner circumferential surface 107*c*.

As mentioned above, forging of the outer circumferential surface of the housing 107 is performed prior to that of the inner circumferential surface 107*c*, whereby undesired deformation of the housing material 107', in particular undesired deformation of a thick-wall part (the upper side in the Fig.) when pressure is applied can be avoided, and the shape of the sealing face 107*d* provided on the outer periphery can be maintained very accurately.

(F) Step of Molding the Thrust Bearing Face

After being subjected to the steps of (D), (E) described above, the thrust bearing face 107*a* of the housing 107 to be formed is formed by cold-forging the housing material 107'. The mold used in this molding step is constituted of, for example, the die 116 and rod 118 shown in FIG. 14 and the lower end face of the upper punch 117 caused to be a molded surface corresponding to the thrust bearing face 107*a* of the housing 107 to be formed, although not shown in the Fig. In the state that the housing material 107' is bound in the radial direction by the die 116 and rod 118, the upper punch 117 is lowered (in the direction of the arrow in the Fig.), and the molded surface (not shown) of the upper punch 117 is pushed against the upper end of the housing material 107' by applying a predetermined pressure. Accordingly, the upper end face of the housing material 107' is formed into a shape copying the molded surface (the thrust bearing face 107*a* of the finished product). Moreover, in this embodiment, although not shown in the Fig. either, by using a hydrodynamic pressure producing part having a groove pattern corresponding to the hydrodynamic grooves 107*a*1 formed in advance on the molded surface of the upper punch 117, the thrust bearing face 107*a* is formed on the housing material 107, while the shape of the hydrodynamic grooves 107*a*1 is formed at the same time.

After being subjected to the steps (D) to (F) described above, the housing 107 (refer to FIG. 11) is formed as a finished product.

The perpendicularity of the thrust bearing face 107*a* with respect to the inner circumferential surface 107*c* or outer circumferential surface 107*e* can be finished to be 20 µm or less (desirably 10 µm or less) as long as it is the housing 107 produced by the production method stated above.

Moreover, the coaxiality of the sealing face 107*d* with respect to the inner circumferential surface 107*c* or outer circumferential surface 107*e* can be finished to be 20 µm or less (desirably 10 µm or less).

Moreover, the coaxiality of the outer circumferential surface 107*e* with respect to the inner circumferential surface 107*c* can be finished to be 20 µm or less (desirably 10 µm or less).

Moreover, the perpendicularity of the thrust bearing face 107*a* relative to the axis of the sealing face 107*d* can be finished to be 20 µm or less (desirably 10 µm or less).

Moreover, the runout of the sealing face 107*d* relative to the axis of the inner circumferential surface 107*c* can be finished to be 20 µm or less (desirably 10 µm or less).

Moreover, the profile of the sealing face 107*d* can be finished to be 20 µm or less (desirably 10 µm or less).

By suppressing these geometric deviations (accuracy of form) between each face constituting the housing 107 to the value within the above-mentioned range, the hydrodynamic bearing apparatus 101 with improved bearing performance, rotational accuracy, sealing performance, etc., or a motor comprising this hydrodynamic bearing apparatus 101 can be provided.

It should be noted that the steps (D) to (F) described above are merely examples of the molds which can be constituted, and other mold constitutions can be also employed as long as each accuracy of form (perpendicularity, coaxiality, etc.) of a molded article can be set to a value within the above range.

A sixth embodiment of the present invention will be described below with reference to FIGS. 15 and 16. It should be noted that description regarding the items common to the fifth embodiment will be eliminated.

Figure 15:
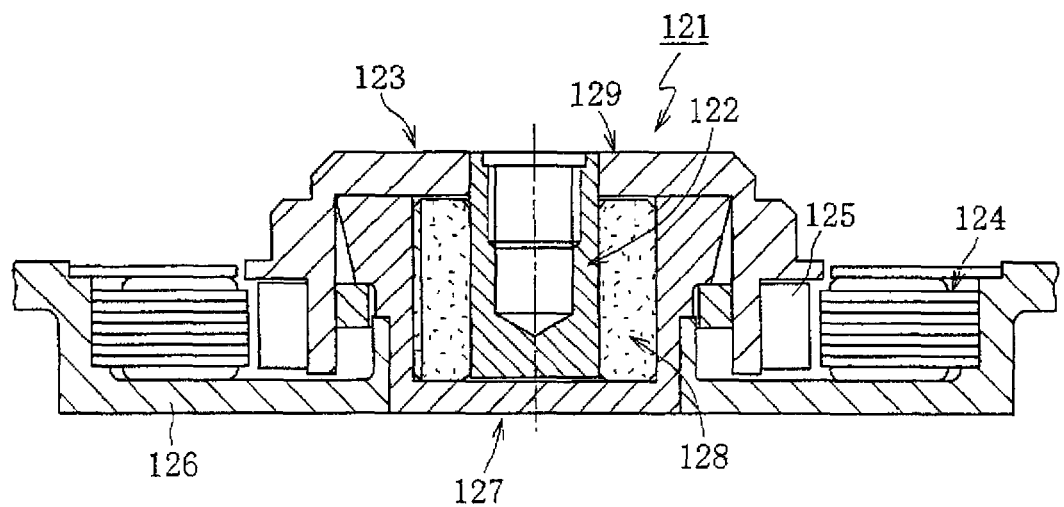
FIG. 15 is a cross-sectional view of a spindle motor for information appliances integrating a hydrodynamic bearing apparatus according to the sixth embodiment of the present invention.

FIG. 15 shows a constitutional example of a spindle motor for information appliances integrating a hydrodynamic bearing apparatus 121 according to the sixth embodiment. this spindle motor is also for use in disk drive units such as HDD and comprises a hydrodynamic bearing apparatus 121 which rotatably supports a rotational member 123 comprising a shaft portion 122 in a non-contact support, for example, a stator coil 124 and a rotor magnet 125 which oppose each other across a gap in the radial direction, and a bracket 126 fixed on the outer periphery of a housing 127 of the hydrodynamic bearing apparatus 121.

Figure 16:
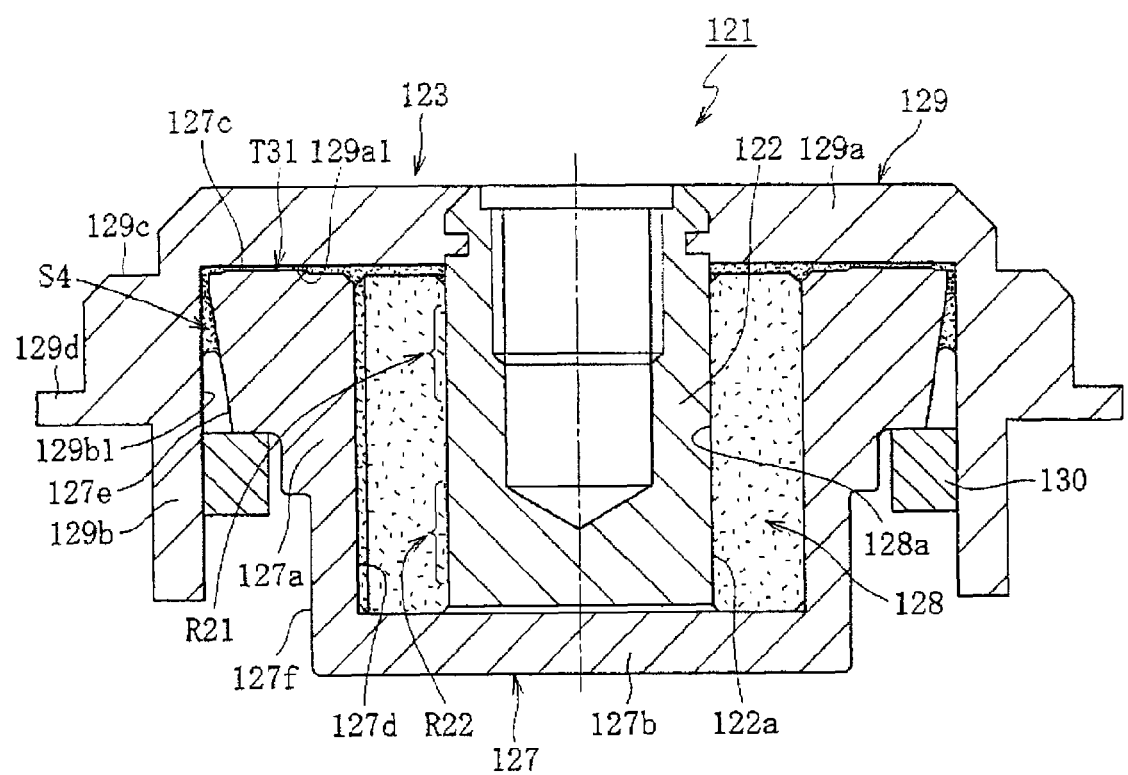
FIG. 16 is a cross-sectional view of a hydrodynamic bearing apparatus.

FIG. 16 shows the hydrodynamic bearing apparatus 121. This hydrodynamic bearing apparatus 121 is constituted of, as main components, the housing 127, a bearing sleeve 128 fixed on the inner periphery of the housing 127, a rotational member 123 which rotates relative to the housing 127 and bearing sleeve 128 in the state that the shaft portion 122 is inserted at the inner periphery of the bearing sleeve 128.

The rotational member 123 is constituted mainly of the shaft portion 122 and a hub portion 129. Among these, the shaft portion 122 is formed, for example, of a metallic material such as stainless steel into a shaft shape having a uniform diameter.

In this embodiment, the hub portion 129 is formed by injection-molding a resin material using the shaft portion 122 as an insert. The hub portion 129 comprises, as shown in FIG. 16, a disk portion 129*a* covering the opening side (upper side in the Fig.) of the housing 127, a cylindrical portion 129*b* extending from the outer circumference of the disk portion 129*a* downwardly in the axial direction, and a disk loading face 129*c* and a brim 129*d* provided on the outer periphery of the cylindrical portion 129*b*. It should be noted that the hub portion 129 may be, for example, made of a metal. In that case, the hub portion 129 and shaft portion 122 may be integrally formed.

The housing 127 is a forged article made of a metallic material (for example, stainless steel), and is formed into a bottomed cylindrical shape. This housing 127 comprises a cylindrical side portion 127*a* and a bottom 127*b* provided at the lower end of the side portion 127*a*. The bottom 127*b* is formed integrally with the side portion 127*a*.

A thrust bearing face 127*c* is formed in the entire or part of the annular region of the end face (upper end face) on the opening side of the housing 127. Although not shown in the Fig., for example, a region in which hydrodynamic grooves are arranged in the shape same as in the FIG. 13 is formed on this thrust bearing face 127*c* as a thrust hydrodynamic pressure producing part. This thrust bearing face (the region where the hydrodynamic grooves are formed) 127*c* opposes the lower end face 129*a*1 of the disk portion 129*a* of the hub portion 129, and forms the thrust bearing gap of a thrust bearing portion T31 described later between itself and the lower end face 129*a*1 when the shaft portion 122 (rotational member 123) is in rotation (refer to FIG. 16).

A tapering sealing face 127*e* whose diameter gradually increases towards the top is formed on outer periphery of an upper part of the side portion 127*a*. A tapering sealing space S4 whose diameter gradually decreases towards the top is formed between this sealing face 127e and the inner circumferential surface 129b1 of the cylindrical portion 129b provided on the hub portion 129. When the shaft portion 122 and hub portion 129 are in rotation, this sealing space S4 is in circulation with the outer diameter side of the thrust bearing gap of a thrust bearing portion T31. Moreover, a latch member 130 which engages the housing 127 in the axial direction and latches the shaft portion 122 when the shaft portion 122 (rotational member 123) is displaced upwardly and relatively in the axial direction is attached on the inner periphery at the lower end of the cylindrical portion 129b of the hub portion 129.

The bearing sleeve 128 is formed, for example, of a porous body made of a metallic non-porous body or sintered metal, in particular a porous body made of a sintered metal comprising copper as a main ingredient in a cylindrical shape, and is fixed in a predetermined position on the inner circumferential surface 127d of the housing 127 by adhesion (including loose adhesion and press fitting adhesion), press fitting, weld adhesion or other fixing means.

In this embodiment, as stated above, a thrust bearing gap is formed only between the thrust bearing face 127c of the housing 127 and the lower end face 129a1 of the disk portion 129a opposing this, and a thrust bearing gap is not formed on the lower end side of the shaft portion 122. Accordingly, the bearing sleeve 128 in the sixth embodiment has a plurality of hydrodynamic grooves as shown in FIG. 12 on its inner circumferential surface 128a, while its upper end face and lower end face are smooth faces having no hydrodynamic grooves.

In the hydrodynamic bearing apparatus 121 so constituted that the inner space of the housing 127 including the sealing space S4 and the thrust bearing gap is filled with the lubricating oil, when the shaft portion 122 (rotational member 123) is in rotation, the regions (regions in two upper and lower positions) which serve as radial bearing faces of the inner circumferential surface 128a of the bearing sleeve 128 oppose the outer circumferential surface 122a of the shaft portion 122 across the radial bearing gap. As the shaft portion 122 rotates, the lubricating oil in the above radial bearing gap is pushed towards the central side in the axial direction of the hydrodynamic grooves, and its pressure is increased. The first radial bearing portion R21 and second radial bearing portion R22 which support the shaft portion 122 in a non-contact support by such a hydrodynamic effect of the hydrodynamic grooves are constituted respectively.

At the same time, an oil film of the lubricating oil is also formed in the thrust bearing gap between the lower end face 129a1 of the hub portion 129 and the thrust bearing face (the region where the hydrodynamic grooves are formed) 127c of the housing 127 opposing this by the hydrodynamic effect of the hydrodynamic grooves. The thrust bearing portion T31 which rotatably supports the shaft portion 122 (rotational member 123) in the thrust direction in a non-contact support by the pressure of this oil film is constituted.

The housing 127 in this embodiment is also produced, for example, in these three steps: a step of molding the outer circumferential surface (D), a step of molding the inner circumferential surface (E), and a step of molding the thrust bearing face (F). A difference exists in that, for example, although not shown in the Fig., in the step of molding the inner circumferential surface (E), the direction of opening the hole in performing the hole opening operation of the inner circumference of the housing material is from the side of the thrust bearing face 127c in the axial direction towards the side opposite to the thrust bearing face 127c side (the side opposite to the side of thrust bearing face 127c).

After being subjected to the steps described above, the housing 127 as a finished product (refer to FIG. 16) is formed.

The perpendicularity of the thrust bearing face 127c with respect to the inner circumferential surface 127d or outer circumferential surface 127f can be finished to be 20 μm or less (desirably 10 μm or less) as long as the housing 127 is produced by the production method stated above.

Moreover, the coaxiality of the sealing face 127e with respect to the inner circumferential surface 127d or outer circumferential surface 127f can be finished to be 20 μm or less (desirably 10 μm or less).

Moreover, the coaxiality of the outer circumferential surface 127f with respect to the inner circumferential surface 127d can be finished to be 20 μm or less (desirably 10 μm or less).

Moreover, the perpendicularity of the thrust bearing face 127c relative to the axis of the sealing face 127e can be finished to be 20 μm or less (desirably 10 μm or less).

Moreover, the runout of the sealing face 127e relative to the axis of inner circumferential surface 127d can be finished to be 20 μm or less (desirably 10 μm or less).

Moreover, the profile of the sealing face 127e can be finished to be 20 μm in or less (desirably 10 μm or less).

The hydrodynamic bearing apparatus 121 with improved bearing performance, rotational accuracy, sealing performance, etc., or a motor comprising this hydrodynamic bearing apparatus 121 can be provided by suppressing these geometric deviations (accuracy of form) between each face constituting the housing 127 to the value within the above-mentioned range.

Although the fifth and sixth embodiments of the present invention are described above, the present invention is not limited to these embodiments.

In the embodiments described above, the case where the housing 107 (127) is formed of, for example, a relatively rigid metal such as SUS by forging is shown as an example. However, the present invention can be also applied to the case where other relatively soft metals such as, for example, brass is formed by forging as well.

Moreover, in the embodiments described above, as a hydrodynamic bearing constituting the radial bearing portions R21, R22 and thrust bearing portions T21, T22, T31, for example, an exemplary bearing in which the hydrodynamic pressure producing part comprising the hydrodynamic grooves in a herringbone shape or a spiral shape is used, but the constitution of the hydrodynamic pressure producing part is not limited to this. Examples of the radial bearing portions R21, R22 include a multilobe bearing, step bearing, taper bearing, taper flat bearing or the like.

Moreover, although not shown in the Fig., one or all of the thrust bearing portions T21, T22, T31 can be also constituted of, for example, such bearings comprising a plurality of hydrodynamic grooves in the shape of a radial groove provided at predetermined intervals in the circumferential direction in a region which serves as the thrust bearing face, i.e., so-called step bearings, so-called wave bearings (in which the steps are in the shape of a wave) or the like.

Moreover, in the embodiments described above, the case where the radial bearing portions R21, R22 and thrust bearing portions T21, T22, T31 are constituted of hydrodynamic bearings is described, but they may be constituted of other bearings. for example, the inner circumferential surface 108a of the bearing sleeve 108 (128) which serves as a radial bearing face is made a perfectly circular inner circumferential surface having no hydrodynamic pressure producing part such as the hydrodynamic grooves 108a1, 108a2, constituting a so-called cylindrical bearing by the perfectly circular outer circumferential surface 102*a* of the shaft portion 102 opposing this inner circumferential surface.

Moreover, in the embodiments described above, the lubricating oil is shown as an example as a fluid which fills and forms a lubricating film in the inside of the hydrodynamic bearing apparatus 101 (121), the radial bearing gap between the bearing sleeve 108 and shaft portion 102 and the thrust bearing gap between the bearing sleeve 108 and shaft portion 102 or between the housing 107 and rotational member 103 (hub portion 109). Other fluids which can form a lubricating film in each bearing gap, for example, gases such as air, lubricants or lubricating greases having fluidity such as magnetic fluids, etc., can be also used.

The invention claimed is:

1. A method for producing a housing for a hydrodynamic bearing apparatus which has a cylindrical shape and comprises a thrust bearing face on a side of the cylindrical shape in an axial direction, a thrust bearing gap which is formed between the thrust bearing face and a rotational member to be supported, a sealing face, and a sealing space which is formed between the sealing face and the rotational member, the method comprising:

a step of forming an outer circumferential surface of a housing material into a shape copying an outer circumferential surface of the housing as a finished product by forge molding and then forming an inner circumferential surface of the housing material into a shape copying an inner circumferential surface of the housing as the finished product by forge molding.

2. The method for producing the housing for the hydrodynamic bearing apparatus according to claim 1, wherein the forge molding of the inner circumferential surface comprises perforating a housing material in the axial direction from a side opposite to the side of the thrust bearing face toward the side of the thrust bearing face.

* * * * *